(12) United States Patent
Seol et al.

(10) Patent No.: US 10,049,094 B2
(45) Date of Patent: Aug. 14, 2018

(54) MOBILE TERMINAL AND METHOD OF CONTROLLING THE SAME

(71) Applicant: LG ELECTRONICS INC., Seoul (KR)

(72) Inventors: Jie Seol, Seoul (KR); Soyeon Yim, Seoul (KR)

(73) Assignee: LG Electronics Inc., Seoul (KR)

( * ) Notice: Subject to any disclaimer, the term of this patent is extended or adjusted under 35 U.S.C. 154(b) by 387 days.

(21) Appl. No.: 15/077,116

(22) Filed: Mar. 22, 2016

(65) Prior Publication Data

US 2017/0052939 A1  Feb. 23, 2017

(30) Foreign Application Priority Data

Aug. 20, 2015 (KR) ........................ 10-2015-0117552

(51) Int. Cl.
*G06F 3/048* (2013.01)
*G06F 17/24* (2006.01)
(Continued)

(52) U.S. Cl.
CPC .......... *G06F 17/243* (2013.01); *G06F 3/0482* (2013.01); *G06F 3/04842* (2013.01); *G06F 3/04883* (2013.01); *G06F 3/04886* (2013.01); *G06K 9/18* (2013.01); *G06K 9/2081* (2013.01); *G06K 9/228* (2013.01); *G06K 9/325* (2013.01);
(Continued)

(58) Field of Classification Search
CPC .. G06F 3/04883; G06F 17/243; G06F 3/0237; G06F 1/1686; G06F 3/04886; G06K 9/325; G06K 9/344; G06K 9/22
See application file for complete search history.

(56) References Cited

U.S. PATENT DOCUMENTS 5,887,086 A * 3/1999 Tokano .................. G06K 9/228
  348/E5.047
2001/0032070 A1* 10/2001 Teicher .................. G06F 17/28
  704/2

(Continued)

FOREIGN PATENT DOCUMENTS

EP  2306270   4/2011
WO  2014208783  12/2014

OTHER PUBLICATIONS

Extended European Search Report in European Application No. 16172278.0-1972/3133801, dated Jan. 1, 2017, 8 pages (with English translation).

*Primary Examiner* — Patrick F Riegler
(74) *Attorney, Agent, or Firm* — Fish & Richardson P.C.

(57) ABSTRACT

Provided is a mobile terminal including: a camera; a touch screen; and a controller that outputs to the touch screen a keypad that includes at least one graphic object of a first graphic object in conjunction with an optical character reader (OCR) function relating to the camera and a second graphic object in conjunction with a photographing function relating to the camera, in which the first and second graphic objects are together displayed on the keypad or one graphic object of the first and second graphic objects is displayed on the keypad, and in which, in a case where one graphic object of the first and second graphic objects is displayed on the keypad, based on application of a predetermined-type touch to the one graphic object, the controller changes one graphic object to the other graphic object.

15 Claims, 25 Drawing Sheets

(51) Int. Cl.
  *G06K 9/34* (2006.01)
  *G06K 9/32* (2006.01)
  *G06K 9/20* (2006.01)
  *G06K 9/22* (2006.01)
  *H04M 1/725* (2006.01)
  *G06F 3/0482* (2013.01)
  *G06F 3/0484* (2013.01)
  *G06F 3/0488* (2013.01)
  *G06K 9/18* (2006.01)

(52) U.S. Cl.
  CPC .......... *G06K 9/344* (2013.01); *H04M 1/7258* (2013.01); *H04M 1/72522* (2013.01); *H04M 1/72583* (2013.01); *H04M 2250/52* (2013.01)

(56) References Cited

U.S. PATENT DOCUMENTS

| | | | |
|---|---|---|---|
| 2006/0146174 A1* | 7/2006 | Hagino | G03B 13/32 348/349 |
| 2011/0175815 A1* | 7/2011 | Zhu | G06K 9/2081 345/168 |
| 2012/0163664 A1* | 6/2012 | Zhu | G06F 3/0481 382/103 |
| 2013/0061166 A1* | 3/2013 | Seo | G06F 3/0488 715/780 |
| 2013/0234945 A1* | 9/2013 | Goktekin | G06K 9/3258 345/168 |
| 2013/0234949 A1* | 9/2013 | Chornenky | G06F 3/0216 345/169 |
| 2014/0056475 A1* | 2/2014 | Jang | G06K 9/18 382/103 |
| 2014/0141836 A1* | 5/2014 | Rozumyanskiy | G06K 9/228 455/556.1 |
| 2014/0184486 A1* | 7/2014 | Jung | G06F 3/005 345/156 |
| 2015/0103002 A1* | 4/2015 | Yoon | G06F 3/0488 345/157 |
| 2015/0220778 A1* | 8/2015 | Macciola | G06K 9/00442 382/112 |
| 2015/0317120 A1* | 11/2015 | Kim | G06F 3/1438 345/1.3 |
| 2016/0037067 A1* | 2/2016 | Lee | H04N 5/23232 348/208.6 |
| 2016/0227052 A1* | 8/2016 | Hosaka | H04N 1/00238 |
| 2016/0269586 A1* | 9/2016 | Nanaumi | H04N 1/32037 |

* cited by examiner

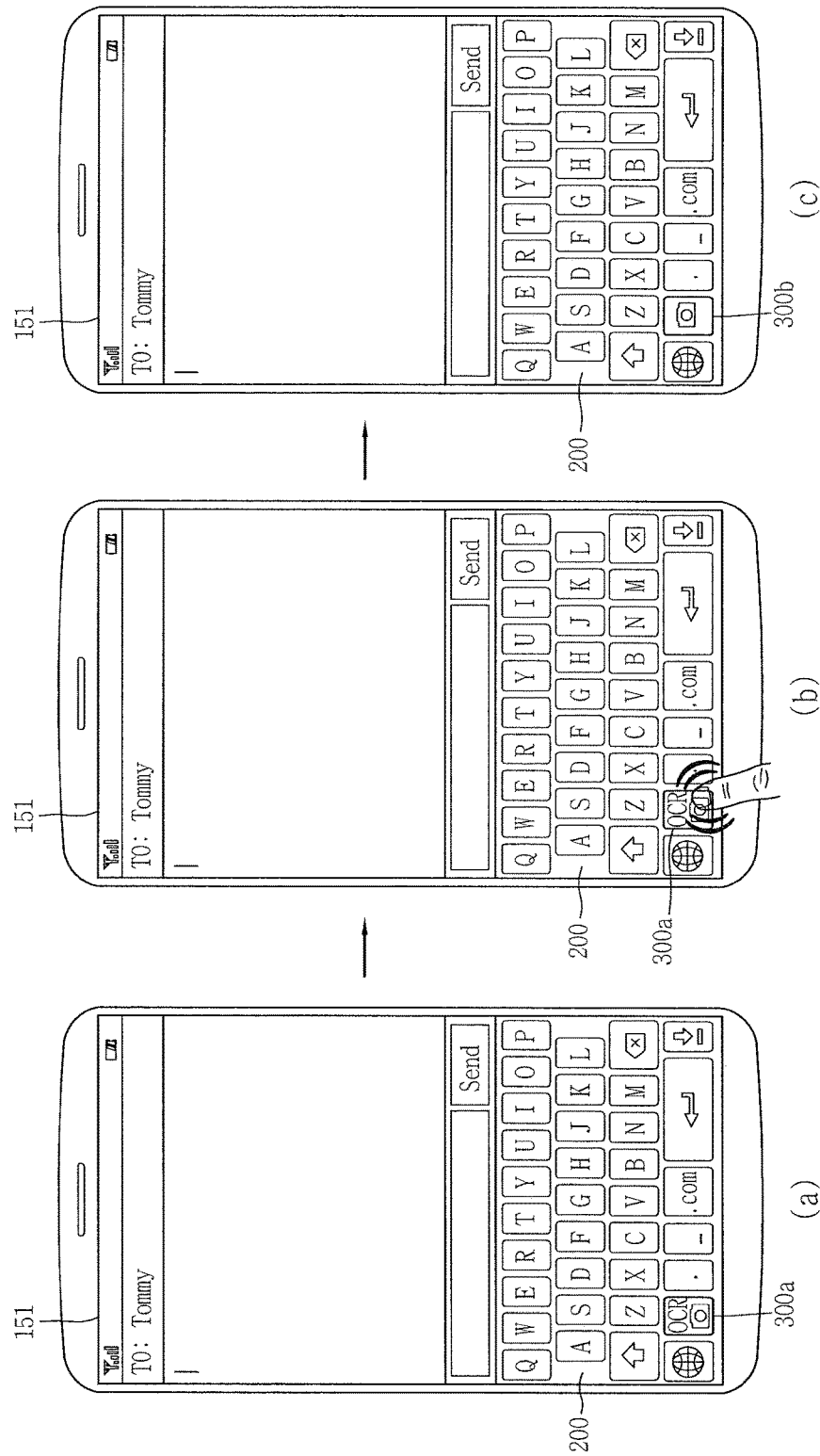

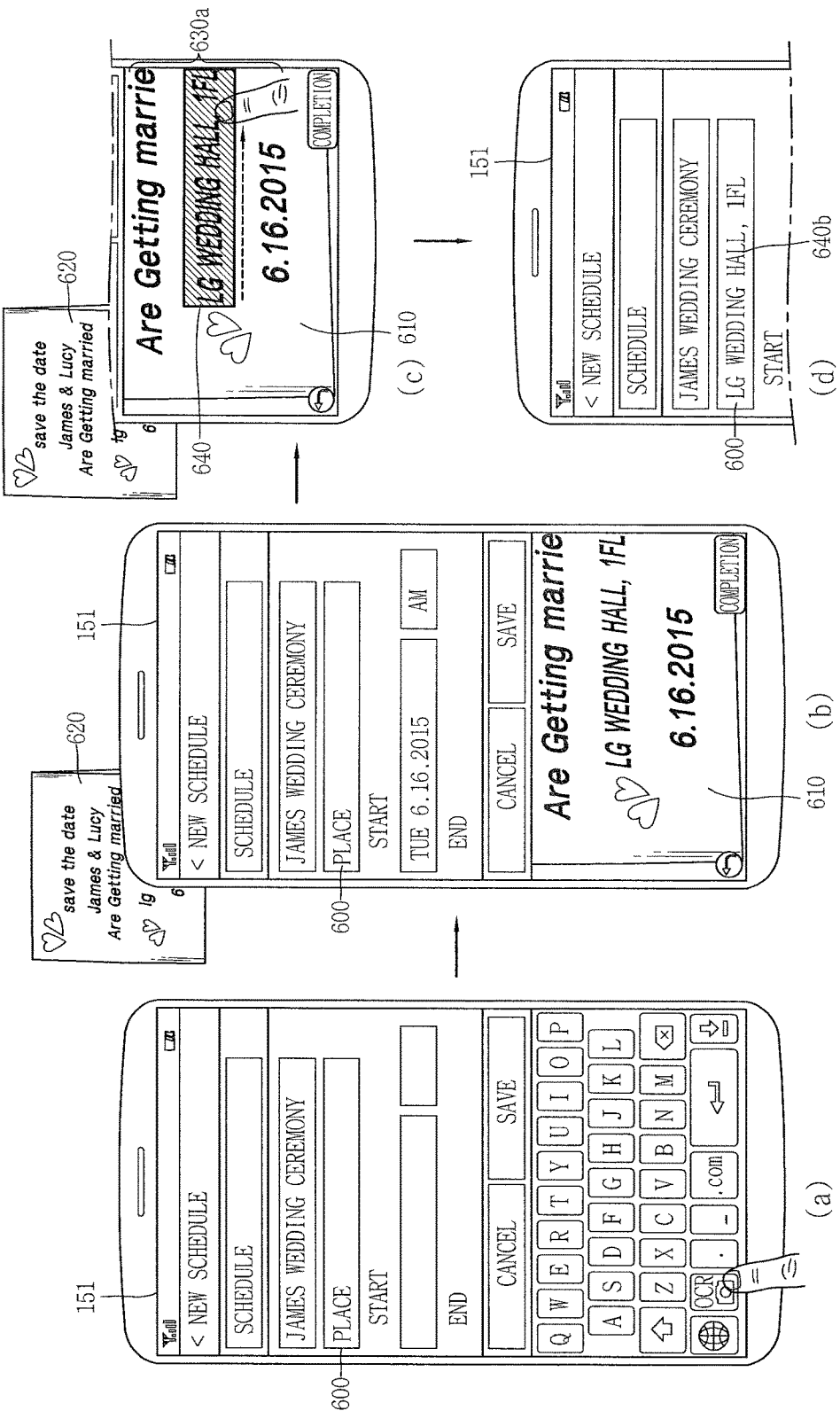

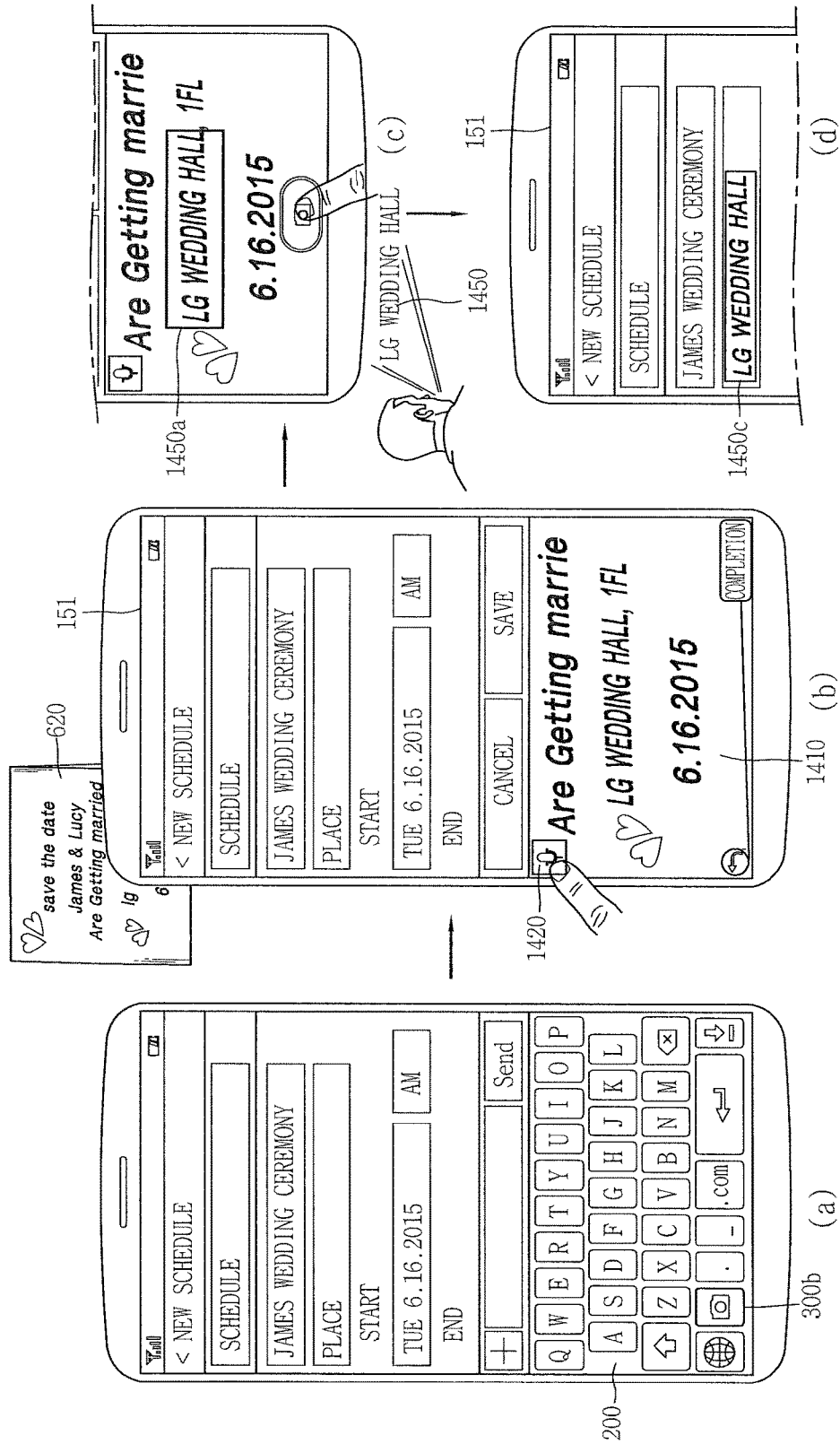

MOBILE TERMINAL AND METHOD OF CONTROLLING THE SAME

CROSS-REFERENCE TO RELATED APPLICATION

Pursuant to 35 U.S.C. § 119(a), this application claims the benefit of earlier filing date and right of priority to Korean Application No. 10-2015-0117552, filed on Aug. 20, 2015, the contents of which is incorporated by reference herein in its entirety.

BACKGROUND OF THE DISCLOSURE

1. Field of the Disclosure

The present disclosure relates to a mobile terminal that increases its usage with user convenience in mind and a method of controlling the mobile terminal.

2. Background of the Disclosure

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

In recent years, application of an optical character reader/recognition (OCR) function to a mobile terminal that is equipped with a camera has been actively studied. The OCR function is a function of reading characters (text) using light. The OCR function that is applied to the mobile terminal is a function in which light is emitted to letters, symbols, and numbers that are printed or hand-written on paper, the reflected right is converted into electrical signals and the electrical signals are input into the mobile terminal.

The OCR function may mean a function of performing image-to-text conversion. That is, the OCR function includes a function in which screen information (an image) that corresponds to text which is included in an image that is received through a camera is converted into text and the text that results from the conversion is input into the mobile terminal.

In addition, in recent years, with advanced camera technologies, a photographing function of capturing the image that is received through the camera has been widely used. Specifically, according to a user request, the mobile terminal captures the image that is received through the camera and inputs the captured image into the mobile terminal.

Accordingly, there is an increasing need for user interface (UI)/user experience (UX) through which information that a user wants is input in the form of text in an optimized way using the OCR function relating to the camera and the photographing function relating to the camera.

SUMMARY OF THE DISCLOSURE

Therefore, an aspect of the detailed description is to provide a mobile terminal that is capable of inputting information in an optimized way and a mobile terminal.

Another object of the detailed description is to provide a mobile terminal that provides a user interface through which information that a user wants can be input into an input field in an optimized way and a method of controlling the mobile terminal.

According to as aspect of the present invention, there is provided a mobile terminal including: a camera; a touch screen; and a controller that outputs to the touch screen a keypad that includes at least one graphic object of a first graphic object in conjunction with an optical character reader (OCR) function relating to the camera and a second graphic object in conjunction with a photographing function relating to the camera, in which the first and second graphic objects are together displayed on the keypad or one graphic object of the first and second graphic objects is displayed on the keypad, and in which, in a case where one graphic object of the first and second graphic objects is displayed on the keypad, based on application of a predetermined-type touch to the one graphic object, the controller changes one graphic object to the other graphic object.

In the mobile terminal, when the one graphic object is the first graphic object, the other graphic object may be the second graphic object, and when the one graphic object is the second graphic object, the other graphic object may be the first graphic object.

In the mobile terminal, the touch screen may include at least one or more input fields, and based on application of a touch to one of the at least one or more input field, the controller may output the keypad that includes at least one of the first and second graphic objects.

In the mobile terminal, the graphic object that differs according to a type of information in conjunction with the input field to which the touch is applied, which is able to be input, may be output to the keypad.

In the mobile terminal, when the input field into which text that is a type of information is able to be input is touched on, the first graphic object may be displayed on the keypad, and, when the input field into which an image that is a type of information is able to be input is touched on, the second graphic object may be displayed on the keypad.

In the mobile terminal, when one of the first and second graphic objects is selected, the controller may output an image that is received through the camera, to the touch screen.

In the mobile terminal, when the first graphic object is selected, the controller may output the image to one region of the touch screen, and, when the second graphic object is selected, may output the image to all regions of the touch screen.

In the mobile terminal, the one region may differ according to a type of touch that is applied to the first graphic object.

In the mobile terminal, when a first type touch is applied to the first graphic object, the controller may output the image on an already-selected input field, and, when a second type touch that is different from the first type touch is applied to the first graphic object, may output the image to at least one portion of the keypad.

In the mobile terminal, in a state where the image is output to the touch screen based on the selection of the first graphic object, when a drag touch is applied to screen information that corresponds to text which is included in the image, the controller may select the screen information to which the drag touch is applied.

In the mobile terminal, based on a user request, the controller may convert the selected screen information into text, and inputs the text that results from the conversion, into an already-selected input field.

In the mobile terminal, the screen information may be selected based on the drag touch that is applied in a first direction, and, when the drag touch is applied, in a second direction perpendicular to the first direction, to the selected screen information, the controller may selection-cancel at least one portion of the selected screen information.

In the mobile terminal, the controller may convert all pieces of screen information that correspond to the text which is included in the image, into text, based on a user request, may select the screen information based on a drag touch that is applied in a first direction, and, when the drag touch is applied, in a third direction that is opposite to the first direction, to the screen information that is included in the image, and then the user request is made, the controller may convert portions other than a portion to which the drag touch is applied in the third direction, of the screen information that corresponds to the text which is included in the image, into text.

In the mobile terminal, in a state where the image is output to the touch screen based on the selection of the second graphic object, based on application of a touch to a photographing button, the controller may capture the image and display the captured image on an already-selection input field.

In the mobile terminal, when a drag touch is applied in one direction to the image and then the touch is applied to the photographing button, the controller may capture the image in such a manner that an image that corresponds to a region to which the drag touch is applied is not output.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings:

FIGS. 3A and 3B are a conceptual diagram for describing the control method that is described referring to FIG. 2;

FIGS. 8A and 8B are conceptual diagrams for describing the methods that are described referring to FIG. 7;

FIGS. 14A to 14B are conceptual diagrams for describing the method that is described referring to FIG. 13.

DETAILED DESCRIPTION OF THE DISCLOSURE

Figure 1A:
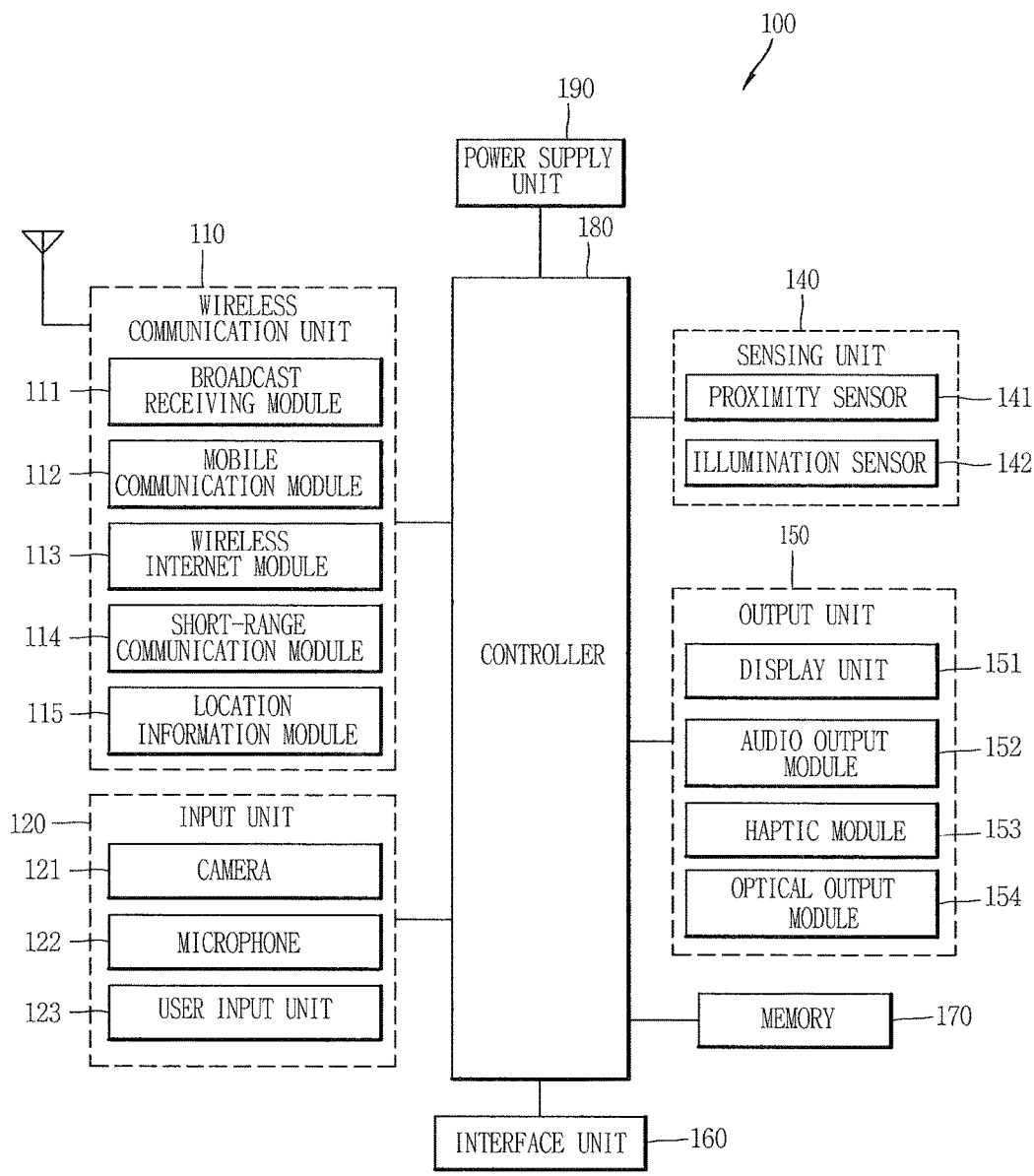
FIG. 1A is a diagram for describing a mobile terminal according to the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
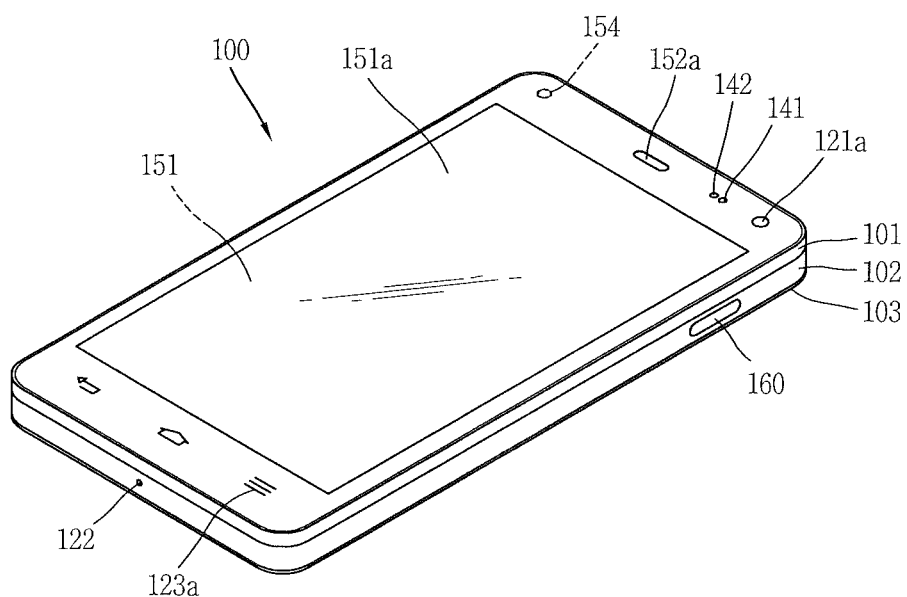
FIGS. 1B and 1C are conceptual diagrams illustrating an example of the mobile terminal according to the present invention when viewed from different directions.
Figure 1C:
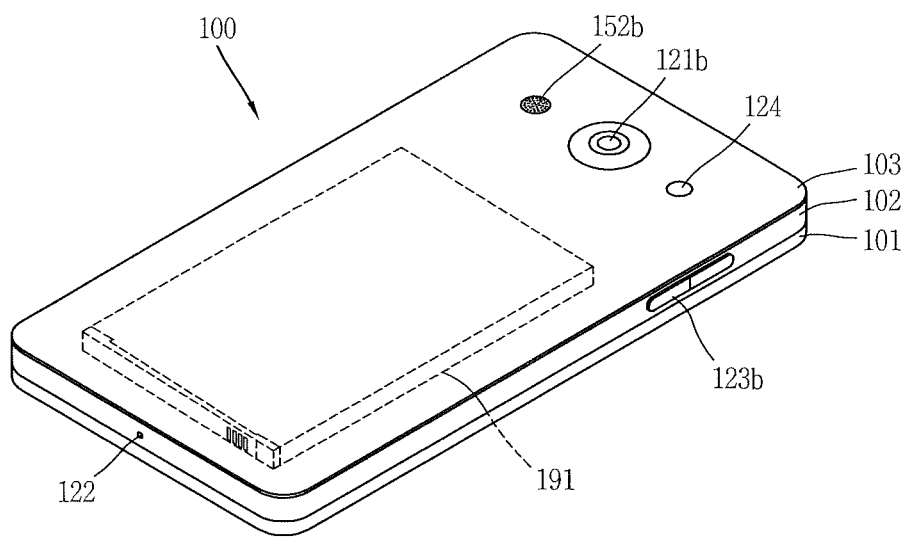

Reference is now made to FIGS. 1A to 1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 121, which is one type of audio input device for inputting an audio signal, and a user input unit 122 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 121, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 122 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1, or activating application programs stored in the memory 170. As one example, the controller 180 controls some or all of the components illustrated in FIG. 1 according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method for a glass type terminal according to various embodiments to be explained later. The operation or the control method for the glass type terminal may be implemented on the glass type terminal by driving at least one application program stored in the memory 170.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like.

Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

A mobile terminal according to one embodiment of the present invention, which is capable of including at least one among the constituent elements described above, outputs a keypad.

The keypad is a means of enabling text, an emoticon, an image, and the like to be input into an input field (an input region, an input window, or the like) that is included in a touch screen 151, and is understood as a keypad, a keyboard, or the like that is realized in software. The keypad is referred to as keypad screen information, a keyboard, keyboard screen information, or the like.

The input field means a filed (or region) for inputting information from a user, of screen information that is output to the touch screen 151. For example, the input field means a region of screen information relating to a memo pad, into which information (data) (for example, an image, a file, text, or the like) is input by the user, a region of screen information relating to a schedule, in which information is input by the user, or the like.

As one example, the keypad is output to the touch screen 151 based on application of a touch to the input field (based on selection made on the input field or on activation performed on the input field).

On the other hand, the mobile terminal according to the present invention performs an OCR function using an image that is received through a camera 121. The OCR function means a function of converting screen information (an image) corresponding to text that is included in the image into text.

A controller 180 displays text that results from performing the OCR function, on in an input field that is displayed on the touch screen 151. For example, the controller 180 inputs text that results from performing the OCR, to the input field of the screen information that is output to the touch screen 151. As another example, after the text results from performing the OCR function, when the touch is applied to the output field into which the text that results from the conversion is to be input, the controller 180 inputs the text that results from the conversion, into the input field to which the touch is applied. As still another example, after at least one portion of the screen information that corresponds to the text that is included in the image is selected through the OCR, when a drag touch that starts from at least the portion is released from the input field that is output to the touch screen 151, the controller 180 may input the text that corresponds to the screen information, into the input field.

On the other hand, the mobile terminal according to the present invention performs a photographing function using the image that is received through the camera 121. The photographing function means a function of capturing the image that is received through the camera 121. The captured image is stored in a memory 170 or is displayed on the already-selected input field.

Referring to the accompanying drawings, a method will be described in detail below in which it is possible to input information in an optimized way using the keypad, the input field, the OCR function, and the photographing function.

Figure 2:
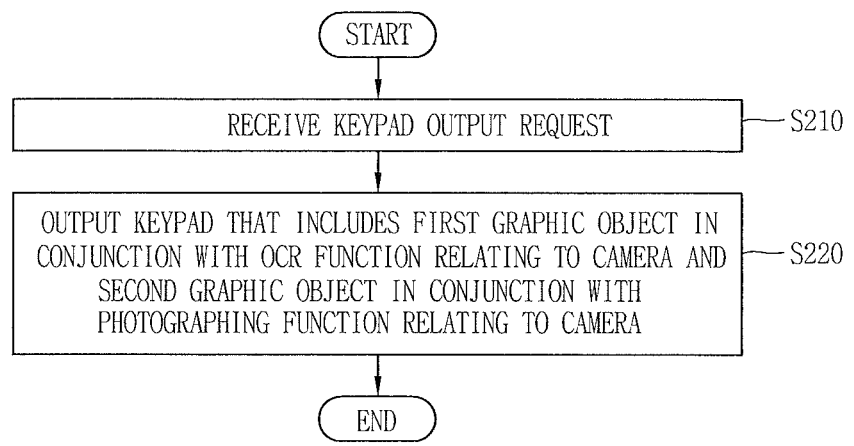
FIG. 2 is a flowchart for describing a typical control method according to the present invention.
Figure 3A:
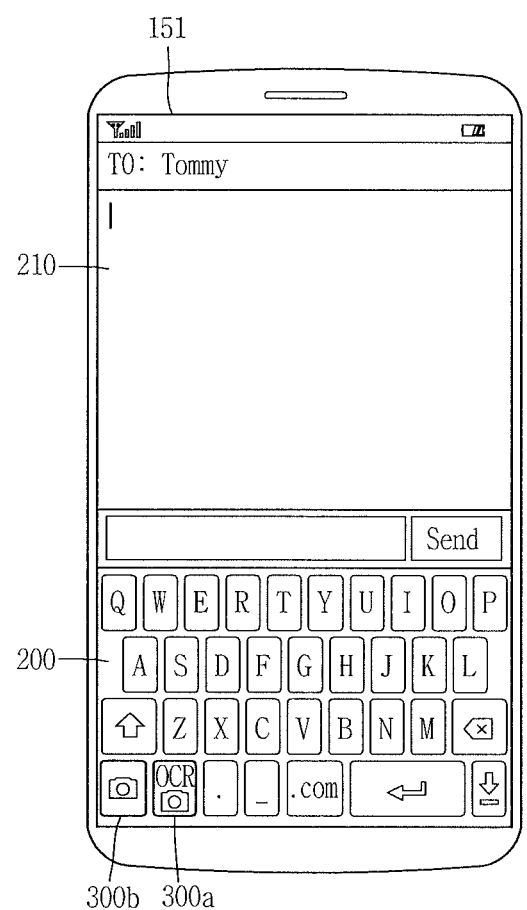

FIG. 2 is a flowchart for describing a typical control method according to the present invention. FIGS. 3A and 3B are a conceptual diagram for describing the control method that is described referring to FIG. 2.

First, referring to FIG. 2, according to the present invention, a step of receiving a keypad output request is performed (S210). Specifically, the controller 180 receives the keypad output request in various ways.

For example, when a touch is applied to any one of the input fields that are included in the touch screen 151, the controller 180 determines the touch that is applied to the touch field, as the keypad output request. Based on the application of the touch on the input field, the controller 180 displays a keypad 200 on at least one portion of an output region of the touch screen 151.

As another example, in a case where an icon in conjunction with a keypad output function is displayed on the touch screen 151, based on selection of the icon, the controller 180 displays the keypad 200 on at least on portion of the output region of the touch screen 151.

The keypad 200 that is output disappears from the touch screen 151 in various ways. For example, in a state where the keypad 200 is output, if the touch is applied to a region other than the region to which the keypad 200 is output, the controller 180 causes the keypad 200 to disappear.

As another example, the keypad 200 includes a button (an icon or a key) in conjunction with a function of causing the keypad 200 to disappear. In this case, based on selection of the button, the controller 180 causes the keypad 200 that is output, to disappear from the touch screen 151.

Thereafter, according to the present invention, based on the keypad output request, a step of outputting the keypad 200 including a first graphic object in conjunction with the OCR function relating to the camera 121 and a second graphic object in conjunction with the photographing function relating to the camera 121 is performed (S220).

Specifically, based on the keypad output request, the controller 180 outputs the keypad 200 that includes at least one of a first graphic object 300a in conjunction with the optical character reader (OCR) function relating to the camera 121 and a second graphic 300b in conjunction with the photographing function relating to the camera 121, to the touch screen 151.

As one example, FIG. 3A illustrates that an execution screen of an application relating to a message is output to the touch screen 151. The execution screen includes an input field 210 for inputting information (text, an image, a moving image, or an emoticon). At this point, the input field 210 may be understood as a region on which the information that is input by the user is displayed.

Referring to FIG. 3A, based on the application of the touch to the input field 210 that is included in the touch screen 151, the controller 180 outputs the keypad 200 to at least one portion of the output region of the touch screen 151.

At this time, as illustrated in FIG. 3A, the first and second graphic objects 300a and 300b are together displayed on the keypad 200.

On the other hand, as illustrated in part (a) of FIG. 3B, only one graphic object (for example, the first graphic object 300a) of the first and second graphic objects 300a and 300b may be displayed on the keypad 200.

Whether the first and second graphic objects 300a and 300b are together displayed on the keypad 200 or only one graphic object of the first and second graphic objects 300a and 300b is displayed on the keypad 200 is determined by a user's setting or a controller's control.

At this point, as one example, based on a type of information in conjunction with the input field that is included in the touch screen 151, which can be input, the controller 180 determines whether the first and second graphic objects 300a and 300b are together displayed on the keypad 200 or only one graphic object of the first and second graphic objects 300a and 300b is displayed on the keypad 200.

For example, in a case where the type of information that can be input into the input field include both of text and an image, the first and second graphic objects 300a and 300b are all displayed on the keypad 200.

As another example, in a case where the type of information that can be input into the input field is text, the controller 180 output only the first graphic object 300a in conjunction with the OCR function to the keypad 200. As another example, in a case where the type of information that can be input into the input field is an image, only the second graphic object 300b in conjunction with the photographing function is output to the keypad 200.

Additionally, the controller 180 outputs the first and second graphic objects 300a and 300b in various ways. Contents relating to this will be described in more detail below referring to FIG. 5 and FIGS. 6A to 6D.

Referring back to FIG. 3B, in a case where one graphic object of the first and second graphic objects 300a and 300b is displayed on the keypad 200, based on application of a predetermined-type to the one graphic object, the controller 180 changes the one graphic object to the other graphic object.

At this point, the predetermined-type touch is a touch in conjunction with a function of changing the graphic object that is displayed on the keypad 200. As the predetermined-type touch, there are various types of touches.

For example, the various types of touches include a short (or tap) touch, a long touch, a double touch, a multi touch, a drag touch, a flick touch, a pinch-in touch, a pinch-out touch, a swipe touch, a hovering touch, and the like.

The various types of touches will be described in more detail below.

The short (or tap) touch is a touch in which a touch object (for example, a finger or a stylus pen) is brought into contact with the touch screen 151 and is separated from the touch screen 151 within a given time thereafter (which is released within a given time after being applied to the touch screen 151). For example, the short (or tap) touch is a touch in which, like a single click with a mouse, the touch object is kept into contact with the touch screen 151 for a short time.

The long touch is a touch in which the touch object is brought into contact with the touch screen 151 and stays there for a given time thereafter. For example, the long touch is a touch that is applied to the touch screen 151 using the touch object and is maintained for a given time thereafter. More specifically, the long touch is a touch that is released after being maintained for a given time at one point on the touch screen 151. In addition, the long touch may be understood as a touch that corresponds to a touch and hold operation in which the touch object is kept into contact with the touch screen 151 for a given time or more.

The double touch refers to the short touch that is applied consecutively at least two times to the touch screen 151 for a given time.

The given time that is used when describing the short touch, the long touch, and the double touch is determined by a user's setting.

The multi touch is a touch in which is applied to at least two contact points on the touch screen 151 substantially at the same time.

The drag touch is a touch that is applied to a first point on the touch screen 151 and is slid along one direction to a second point on the touch screen 151, which is different from the first point, and is released from the second point.

Specifically, the drag touch is a touch in which the touch object is brought into contact with a first point on the touch screen 151, is dragged along one direction to a second point on the touch screen 151, which is different from the first point, and is separated from the second point.

In addition, the drag touch may mean a touch that is applied to one point on the touch screen 151 and then is continuously slid from the one point.

The flick touch refers to the drag touch that is applied within a given time. Specifically, the flick touch is a touch in which the touch object that is brought into contact with one point on the touch screen 151 is separated from the touch screen 151 within a given time. In other words, the flick touch is understood as the drag touch that is applied at a predetermined speed or above.

The swype touch is the drag touch that is applied in a straight line.

The pinch-in touch is first and second touches which are applied to two different points (two separately-positioned points) on the touch screen 151, respectively, and at least one of which is slid toward the other. For example, the pinch-in touch is a touch that is realized by an operation in which two fingers are brought into contact with two separately-positioned points on the touch screen 151, respectively, and in such a state, a distance between the two fingers is decreased.

The pinch-out touch is first and second touches which are applied to two different points (two separately-positioned points) on the touch screen 151, respectively, and at least one of which is slid away from the other. For example, the pinch-out touch is a touch that corresponds to an operation in which two fingers are brought into contact with two separately-positioned points on the touch screen 151, respectively, and in such a state, a distance between the two fingers is increased (the two fingers are moved away from each other).

The hovering touch is a touch that corresponds to an operation in which the touch object is moved in space in a state of being separated from the touch screen 151 without coming into contact with the touch screen 151. One example of the hover touch is a proximity touch that is described referring to FIG. 1A. For example, the hovering touch is a touch that corresponds to an operation in which the touch object stays at a point in space for a given time or above in a state of being positioned separately from the touch screen 151.

In the present specification, the long touch is described, for example, as a predetermined-type touch in conjunction with a function of changing a graphic object being displayed on the keypad 200 to a different graphic object is an example of the long touch.

In a case where only one graphic object (for example, the graphic object 300*a*) of the first and second graphic objects 300*a* and 300*b*, as illustrated in part (a) of FIG. 3B, is displayed on the keypad 200, the controller 180, as illustrated in part (b) of FIG. 3B, detects that a predetermined-type touch (the long touch) is applied to the one graphic object 300*a*.

Based on the application of the predetermined-type touch (the long touch), the controller 180, as illustrated in part (c) of FIG. 3B, changes the one graphic object 300*a* to the other graphic object 300*b*.

At this time, when the one graphic object is the first graphic object 300*a*, the other graphic object is the second graphic object 300*b*. When the one graphic object is the second graphic object 300*b*, the other graphic object is the first graphic object 300*a*. As one example, this operation is understood as a toggle operation.

With this configuration, according to the present invention, the keypad 200 is provided that enables the OCR function or the photographing function to be selected in a more convenient manner.

Referring to the accompanying drawings, a method will be described in more detail below in which various pieces of information are input using the first graphic object 300*a* in conjunction with the OCR function and the second graphic object 300*b* in conjunction with the photographing function.

Figure 4A:
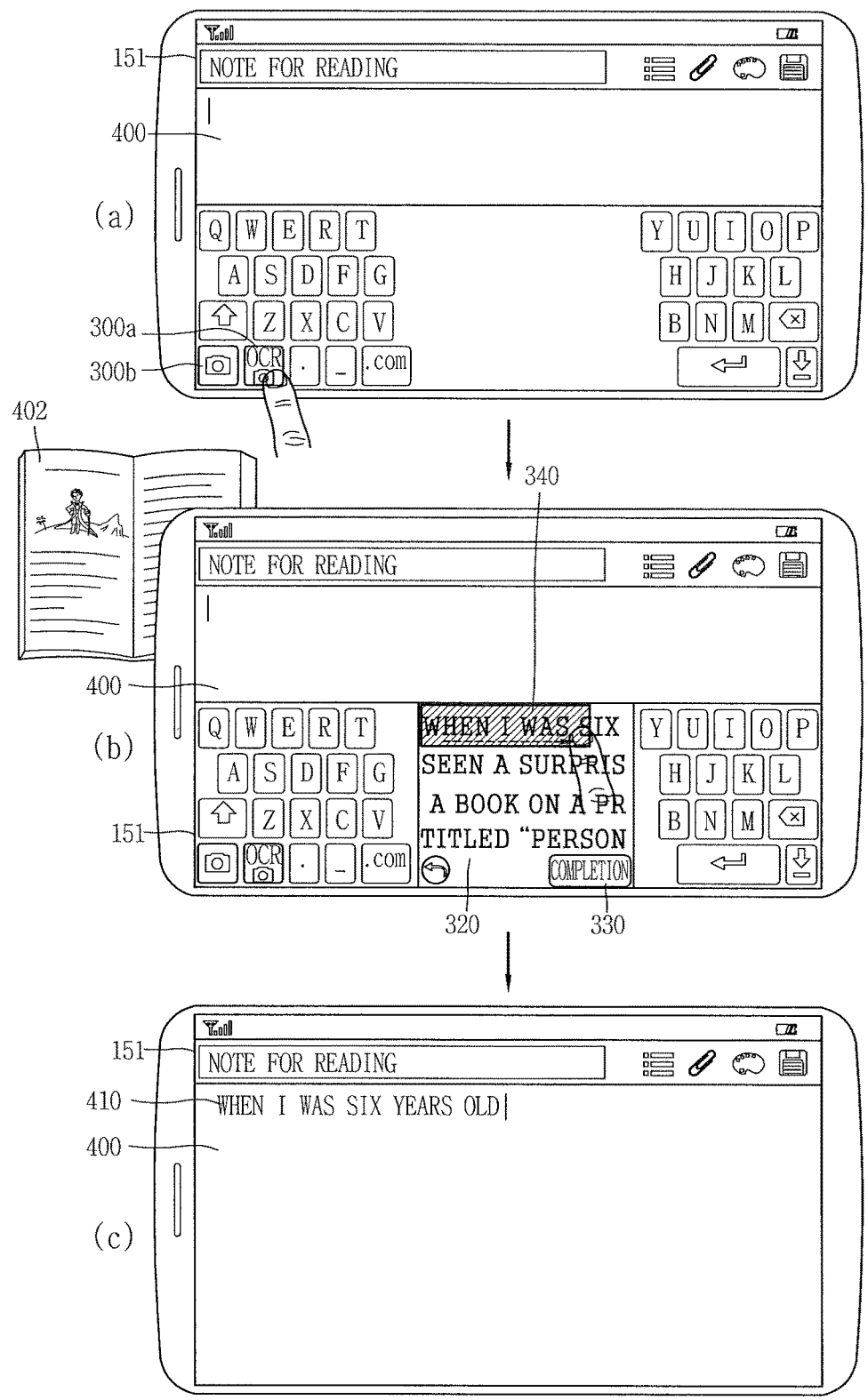
FIGS. 4A and 4B are conceptual diagrams for describing a method of inputting information using an OCR function and a photographing function according to one embodiment of the present invention.
Figure 4B:
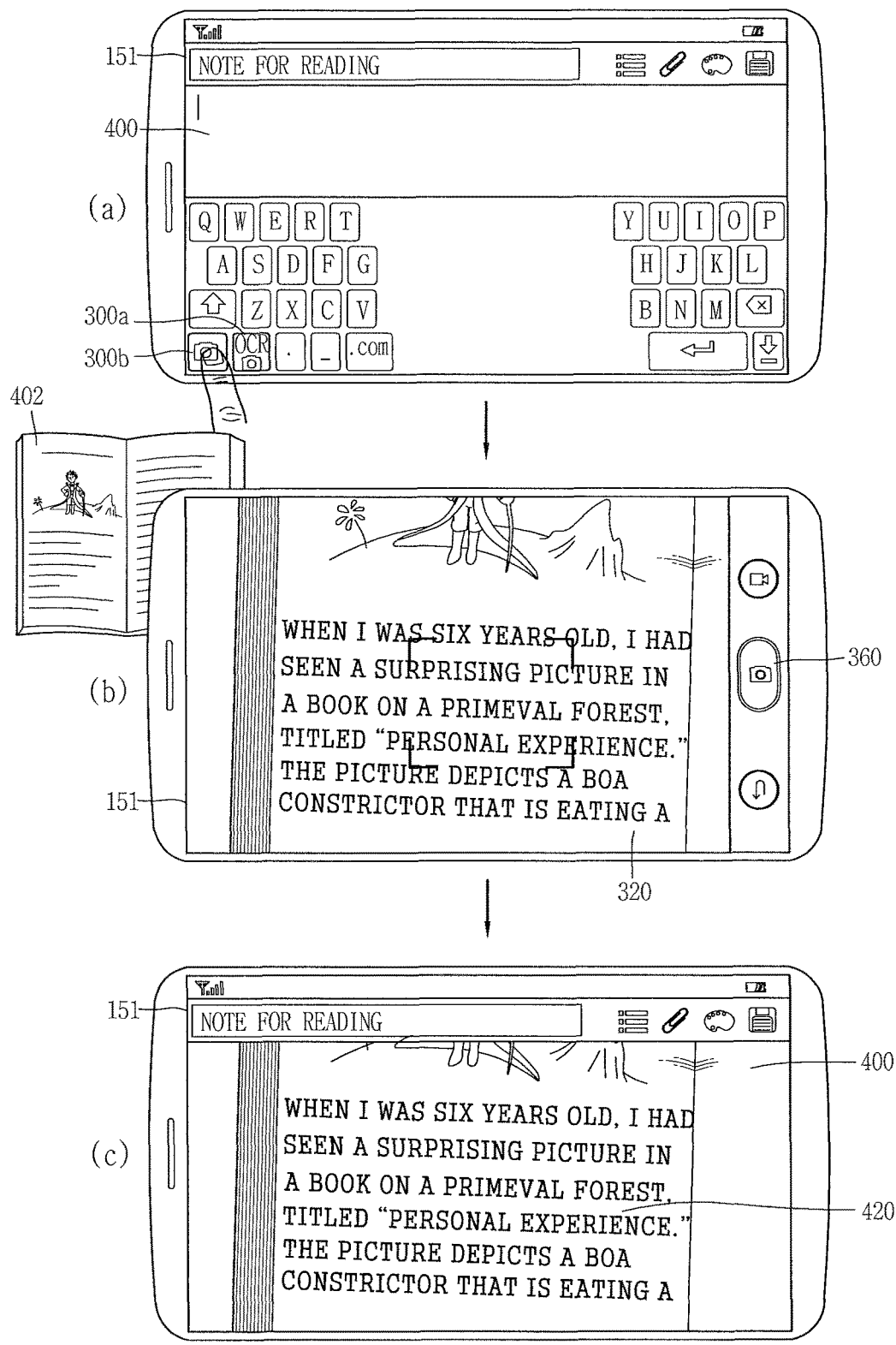

FIGS. 4A and 4B are conceptual diagrams for describing the method of inputting information using the OCR function and the photographing function according to one embodiment of the present invention.

When one of the first graphic object 300*a* in conjunction with the OCR function and the second graphic object 300*b* in conjunction with the photographing function is selected (touched on), the controller 180 outputs an image 320 that is received through the camera 121.

The image 320 that is received through the camera 121 is referred to as a preview image. The preview image means an image that is received through the camera 121 and is displayed in real time. Screen information (an image or the like) that is included in the preview image is changed based on movement of a photographic subject or a mobile terminal 100.

On the other hand, when the first graphic object 300*a* in conjunction with the OCR function is selected, the controller 180 outputs the image 320 to one region of the touch screen 151. When the second object 300*b* in conjunction with the photographing function is selected, the controller 180 outputs the image 320 to all output regions of the touch screen 151.

The outputs region of the touch screen 151 may correspond to all regions to which the screen information can be output, and may mean regions other than a status bar, among all the regions.

When the first graphic object 300*a* in conjunction with the OCR function relating to the camera 121, as illustrated in part (a) of FIG. 4A, is selected, the controller 180, as illustrated in part (b) of FIG. 4A, outputs the image 320 that is received through the camera 121, to one region of the touch screen 151. The one region differs according to a type of touch that is applied to the first graphic object 300*a*.

Contents relating to this will be described in more detail below referring to FIG. 7 and FIGS. 8A and 8B.

When the second graphic object 300*b* in conjunction with the photographing function relating to the camera 121, as illustrated in part (a) of FIG. 4B, is selected, the controller 180, as illustrated in part (b) of FIG. 4B, outputs the image 320 that is received through the camera 121, to all output regions of the touch screen 151.

However, limitation to this is not imposed. Although the first graphic object 300*a* in conjunction with the OCR function is selected, the controller 180 controls the touch screen 151 in such a manner that the image 320 that is received through the camera 121 is output to all the output regions of the touch screen 151.

Referring back to FIG. 4A, the image 320 that is received through the camera 121, as illustrated in part (b) of FIG. 4A, includes screen information (an image) that corresponds to text, when the camera 121 faces a photographic subject 402 on which the text is printed.

At this time, when a predetermined-type touch (for example, the drag touch), as illustrated in part (b) of FIG. 4A, is applied to screen information 340 that corresponds to text which is included in the image 320 that is output to the touch screen 151, the controller 180, illustrated in part (c) of FIG. 4A, converts the screen information 340 to which the drag touch is applied, into text 410.

Specifically, based on the application of the predetermined-type touch (the drag touch) on the image 320, the controller 180 selects screen information that is included in the image 320. At this time the selected screen information is screen information that corresponds to a path that is traced by the predetermined-type touch (the drag touch) that is applied.

In a case where screen information that corresponds to text is included in the selected screen information, based on selection of button 330 in conjunction with the OCR function (that is, a function of converting an image into text or a function of performing conversion into text), the controller 180 converts the screen information into text.

Thereafter, the controller 180 inputs (displays) the text 410 that results from the conversion, into (on) an input field 400 (for example, an already-selected input field).

On the other hand, as illustrated in part (b) of FIG. 4B, in a case where the graphic object 300*b* in conjunction with the photographing function is selected, the image 320 that is received through the camera 121 and a photographing button 360 that performs an photographing operation are displayed on the touch screen 151.

When the photographing button 360 is selected, the controller 180 captures the image 320 that is received through the camera 121, and as illustrated in part (c) of FIG. 4B, displays a captured image 420 on an input field 400 (for example, an already-selected input field).

In FIG. 4A, a type of information that is input into the input field is text. In FIG. 4B, a type of information that is input into the input field is an image.

With this configuration, according to the present invention, in a case where information is input into the input field, a method and an UI/UX are provided in which text or an image is selected in a more convenient manner and is input (applied) into (to) the input field.

Referring to the accompanying drawings, a method will be described in more detail below in which one graphic object of the first and second graphic objects 300a and 300b that are described referring to FIG. 3, is output to the keypad 200.

Figure 5:
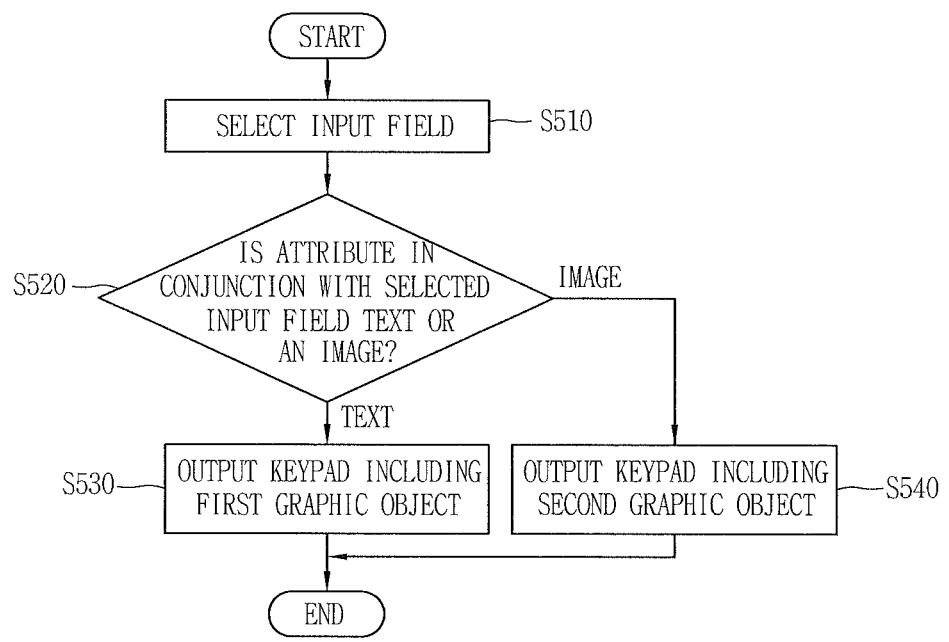
FIG. 5 is a flowchart for describing a method of outputting a first graphic object in conjunction with the OCR function and a second graphic object in conjunction with the photographing function to a keypad according to one embodiment of the present invention.

FIG. 5 is a flowchart for describing a method of outputting the first graphic object 300a in conjunction with the OCR function and the second graphic object 300b in conjunction with the photographing function to the keypad 200 according to one embodiment of the present invention. FIGS. 6A to 6D are conceptual diagrams for describing the method that is described referring to FIG. 5.

Referring to FIG. 5, according to the present invention, a step of selecting the input field is performed (S510).

Figure 6A:
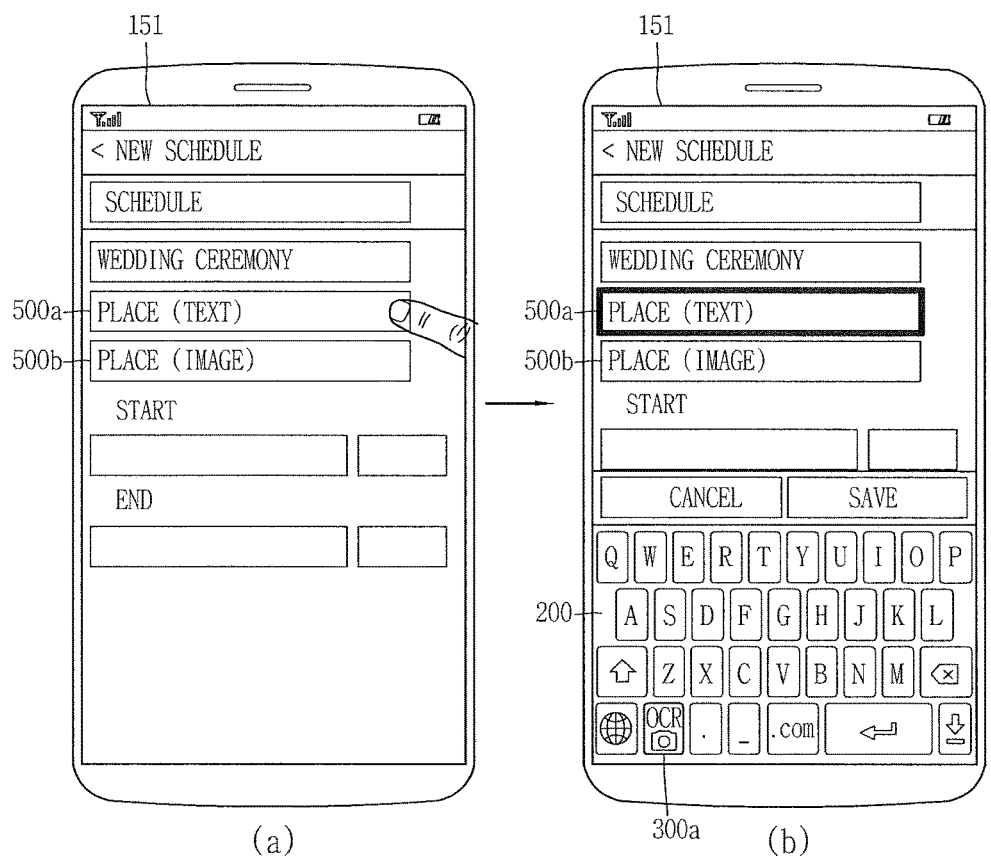
FIGS. 6A to 6D are conceptual diagrams for describing the method that is described referring to FIG. 5.

Referring to FIG. 6A(a), the touch screen 151 includes at least one input field 600a or 600b.

When a touch is applied to at least one input field of at least one or more input fields that are included in the touch screen 151, the controller 180 selects an input field to which the touch is applied.

At this time, the selected input field has a different form than a pre-selection input field. For example, an indicator indicating that the input field is selected is displayed on the selected input field. In addition, a cursor is displayed on the selected input field. In addition, in a state where a predetermined alerting information is displayed before an input field is selected, when a touch is applied to the input field, the predetermined alerting information is not displayed or is displayed in a dimmer (more lightened) manner on the selected input field.

Based on the application of the touch to one of at least one or more input fields, the controller 180 outputs the keypad 200 that includes at least one of the first graphic object 300a in conjunction with the OCR function and the second graphic object 300b in conjunction with the photographing function, to the touch screen 151.

At this time, the graphic object that differs according to a type of information in conjunction with the input field to which the touch is applied, which can be input, is output to the keypad.

To this end, the controller 180 determines whether or not an attribute (for example, a type of information that can be input) in conjunction with the selected input field is text or an image (S520).

In a case where the attribute (the type of information that can be input) is text, the controller 180 outputs the keypad 200 that includes the first graphic object 300a in conjunction with the OCR function, to the touch screen 151 (S530).

On the other hand, in a case where the attribute (the type of information that can be input) is an image, the controller 180 outputs the keypad 200 that includes the graphic object 300b in conjunction with the photographing function, to the touch screen 151 (S540).

At this time, the keypad 200 includes only the first graphic object 300a or only second graphic object 300b.

For example, as illustrated in part (a) of FIG. 6A, the touch screen 151 includes at least one input field 500a or 500b. At this time, one of at least one or more input fields is an input field 500a into which text that is a type of information can be input, and the other is an input field 500b into which an image that is a type of information can be input.

When the input field 500a into which text that is a type of information can be input, as illustrated in part (a) of FIG. 6A, is touched on, the controller 180, as illustrated in part (b) of FIG. 6A, outputs the keypad 200 that includes the first graphic object 300a in conjunction with the OCR function, to the touch screen 151. That is, based on the touch-on of the input field 500a into which text that is a type of information can be input, the keypad 200 includes the first graphic object 300a in conjunction with the OCR function.

Figure 6B:
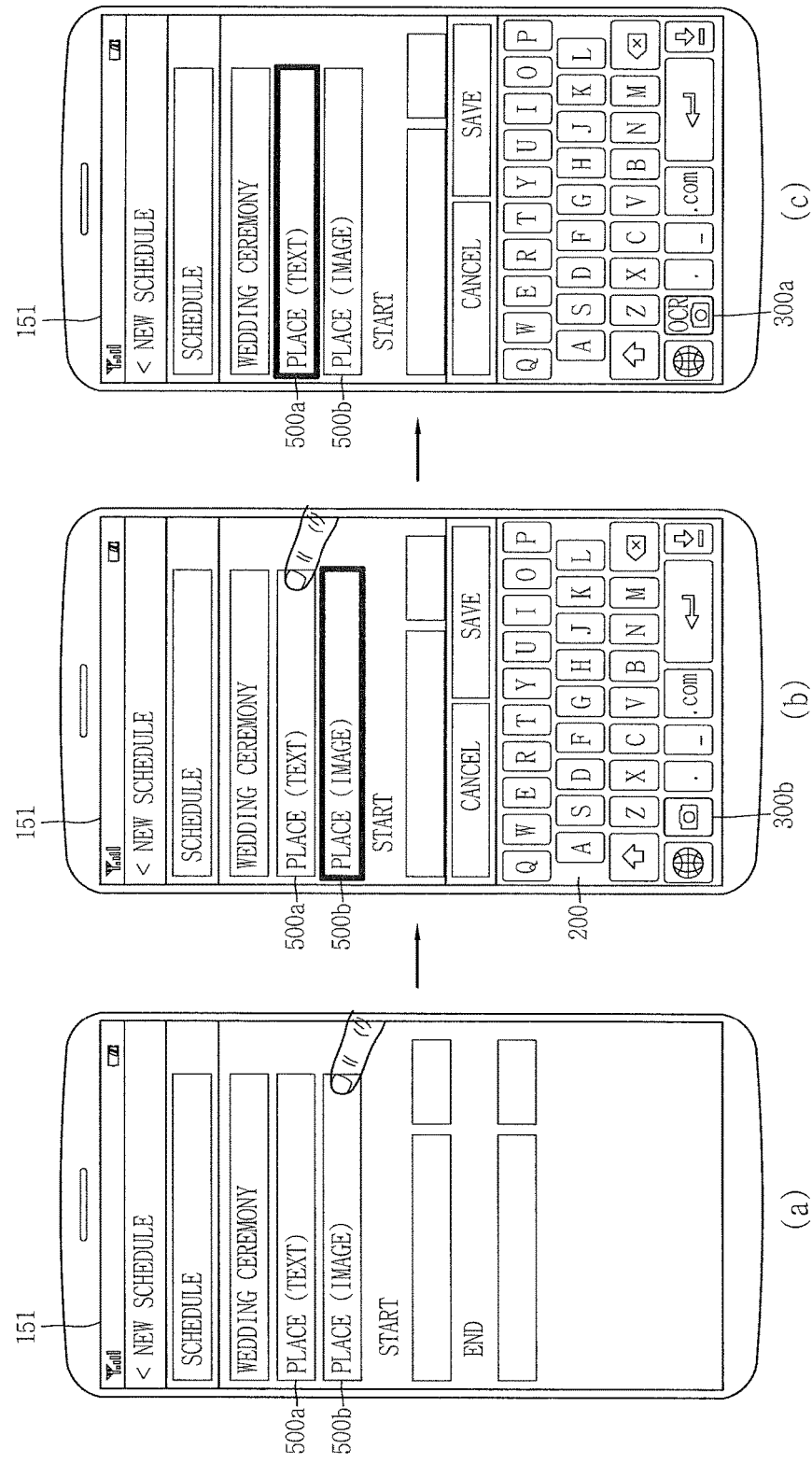
Figure 6C:
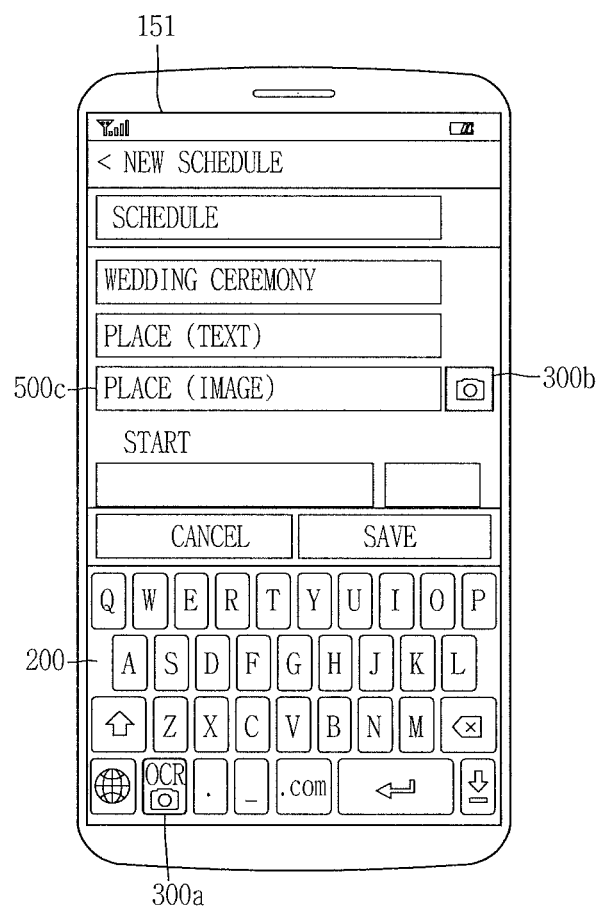

When the input field 500b into which an image that is a type of information can be input, as illustrated in part (a) of FIG. 6B, is touched on, the controller 180, as illustrated in part (b) of FIG. 6B, outputs the keypad 200 that includes the second graphic object 300b in conjunction with the photographing function, to the touch screen 151. That is, based on the touch-on of the input field 500b into which an image that is a type of information can be input, the keypad 200 includes the second graphic object 300b in conjunction with the photographing function.

In a state where the keypad 200 including the second graphic object 300b is output, when a touch, as illustrated in part (b) of FIG. 6B, is applied to the input field 500a into which text that is a type of information can be input, the controller 180, as illustrated in part (c) of FIG. 6B, changes the second graphic object 300b that is displayed on the keypad 200, to the first graphic object 300a.

Although not illustrated, in a state where the keypad 200 on which the first graphic object 300a is displayed is displayed on the touch screen 151, a touch is applied to the input field 500b into which text that is a type of information can be input, the controller 180 changes the graphic object 300a that is displayed on the keypad 200, to the second graphic object 300b.

On the other hand, the present invention is not limited to the embodiments described above. For example, the controller 180 may display at least one of the first graphic object 300a and the second graphic object 300b on a region other than the keypad 200.

For example, as illustrated in FIG. 6O, the first graphic object 300a in conjunction with the OCR function is displayed on the keypad 200, the second graphic object 300b in conjunction with the photographing function is displayed on the vicinity of an input field 500c into which an image that is a type of information can be input.

Although not illustrated, the reverse of this is possible. That is, the second graphic object 300b in conjunction with the photographing function may be displayed on the keypad 200, and the first graphic object 300a may be displayed on the vicinity of the input field into which text that is a type of information can be input.

Based on the selection of the input field, at least one of the first graphic object 300a and the second graphic object 300b is displayed on the vicinity of the input field. That is, at least one of the first graphic object 300a and the second graphic object 300b may be displayed by default on the vicinity of the input field, and, based on the selection (the touch-on) of the input field, the input field may be output to the vicinity of the input field.

Figure 6D:
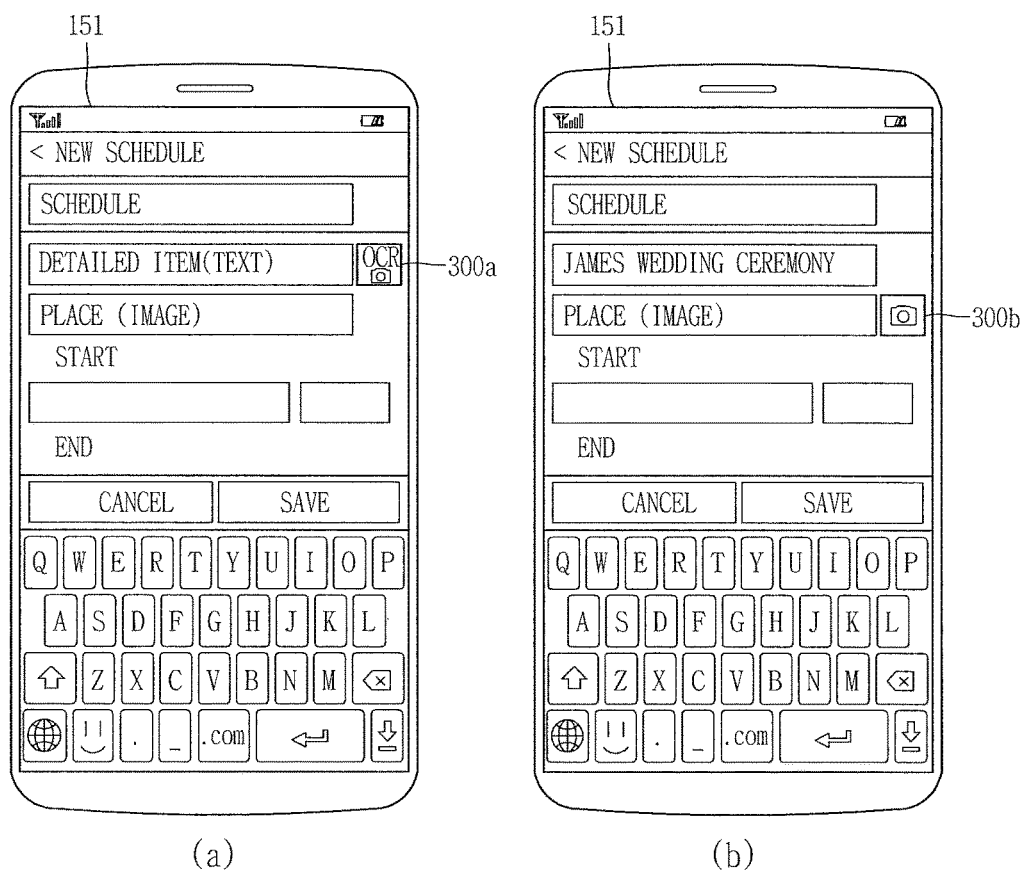

For example, in a state where the first graphic object 300a and the second graphic object 300b are not output, when the input field into which text that is a type of information can be input, as illustrated in part (a) of FIG. 6D, is selected, in response to the selection, the controller 180 outputs the first graphic object 300a in conjunction with the OCR function to the vicinity of the selected input field.

For example, in the state where the first graphic object 300a and the second graphic object 300b are not output, when the input field into which an image that is a type of information can be input, as illustrated in part (b) of FIG. 6D, is selected, in response to the selection, the controller 180 outputs the second graphic object 300b in conjunction with the photographing function to the vicinity of the selected input field.

With this configuration, according to the present invention, a user interface can be provided through which the graphic object in conjunction with the OCR function or the photographing function is output in an optimized way according to the input field into which the user wants to input text or an image.

A method of performing the OCR function or the photographing function described above will be described in more detail referring to the accompanying drawings.

Figure 7:
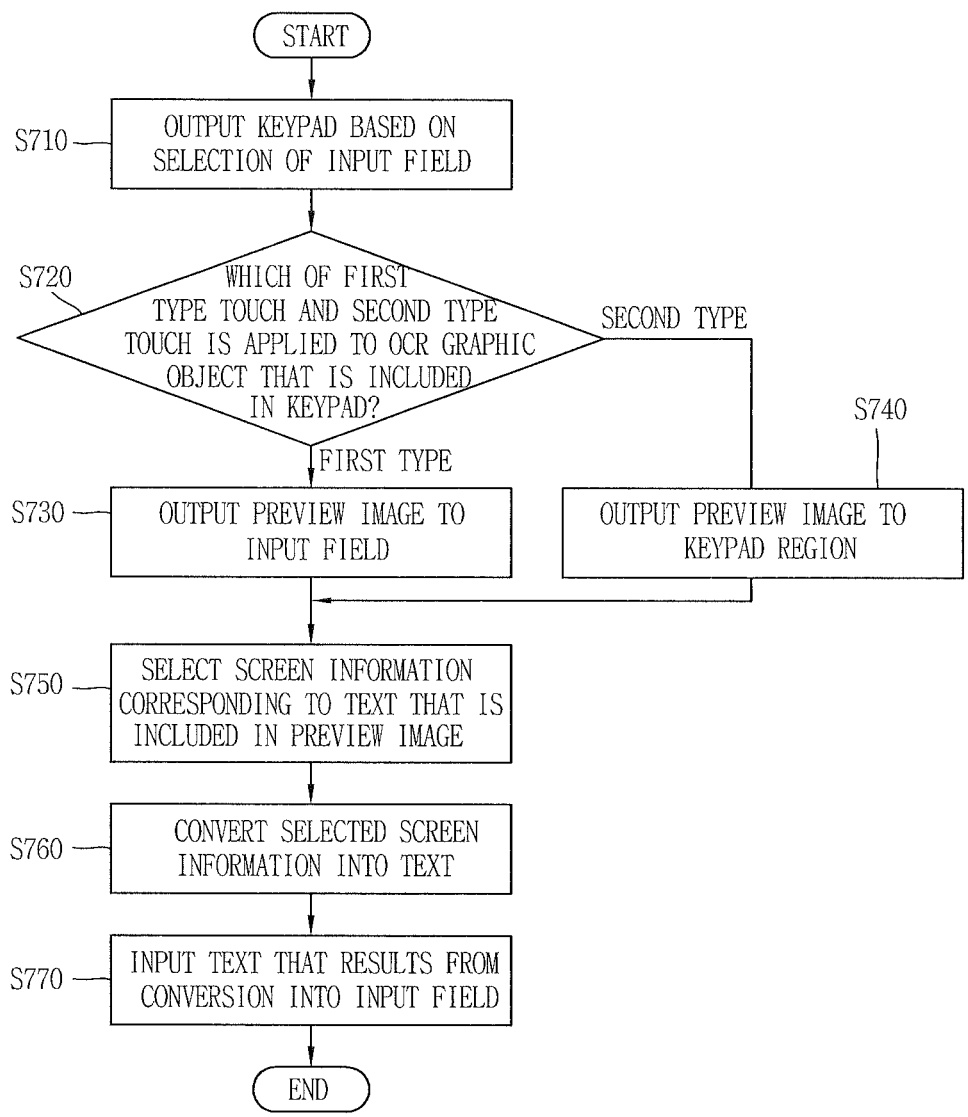
FIG. 7 is a flowchart for describing a method of outputting an image that is received through a camera and a method of inputting text using the image that is output, according to one embodiment of the present invention.

FIG. 7 is a flowchart for describing a method of outputting the image that is received through the camera 121 and a method of inputting text using the image that is output, according to one embodiment of the present invention. FIGS. 8A and 8B are conceptual diagrams for describing the methods that are described referring to FIG. 7.

Referring to FIG. 7, as described above, based on the selection of the input field that is displayed on the touch screen 151, the controller 180 outputs the keypad 200 that includes at least one of the first graphic object 300a in conjunction with the OCR function and the second graphic object 300b in conjunction with the photographing function, to the touch screen 151 (S710).

When at least one of the first and second graphic objects 300a and 300b is selected, the controller 180 outputs an image that is received through the camera 121, to the touch screen 151.

At this time, when the first graphic object 300a is selected, the controller 180 outputs the image to one region of the touch screen 151. When the second graphic object 300b is selected, the controller 180 outputs the image to all regions of the touch screen 151.

At this time, the controller 180 outputs the image to different regions of the touch screen 151 according to a type of touch that is applied to the first graphic object 300a. That is, the one region differs according to the type of touch that is applied to the first graphic object 300a.

To this end, according to the present invention, a step of determining whether a first type touch or a second type touch is applied to the first graphic object 300a in conjunction with the OCR function that is included in the keypad 200 is performed (S720). Specifically the first type touch and the second type touch are among the various types of touches that are described above. The first type touch and the second type touch are different from each other.

When the result of the determination is that a touch type that is applied to the first graphic object 300a is the first type touch, the controller 180 outputs an image (a preview image) that are received through the camera 121, to the input field that is already elected in S710 (S730).

When the result of the determination is that a touch type that is applied to the first graphic object 300a is the second type touch that is different from the first type, the controller 180 outputs the image (the preview image) that is received through the camera 121, to at least one portion of the region on which the keypad 200 is displayed, of the touch screen 151 (S740).

Subsequently, according to the present invention, a step of selecting screen information that corresponds to text that is included in the image (the preview image) is performed (S750). For example, in a state where the image is displayed on the already-selected input field, when a touch is applied to the image in a state where screen information corresponding to text is displayed on the image, the controller 180 selects the screen information that is displayed on the image.

As another example, based on the application of the drag touch to the image, the controller 180 selects at least one portion of the screen information that corresponds to the text which is included in the image.

Subsequently, the controller 180 converts the selected screen information into text (S760). The conversion into text is performed based on a user request (for example, selection of a button in conjunction with the function of performing the conversion into text), or is performed based on selection of the screen information that corresponds to the text in the image.

Subsequently, the controller 180 inputs the text that results from the conversion to the input field that is selected in S710 (S770).

Figure 8A:
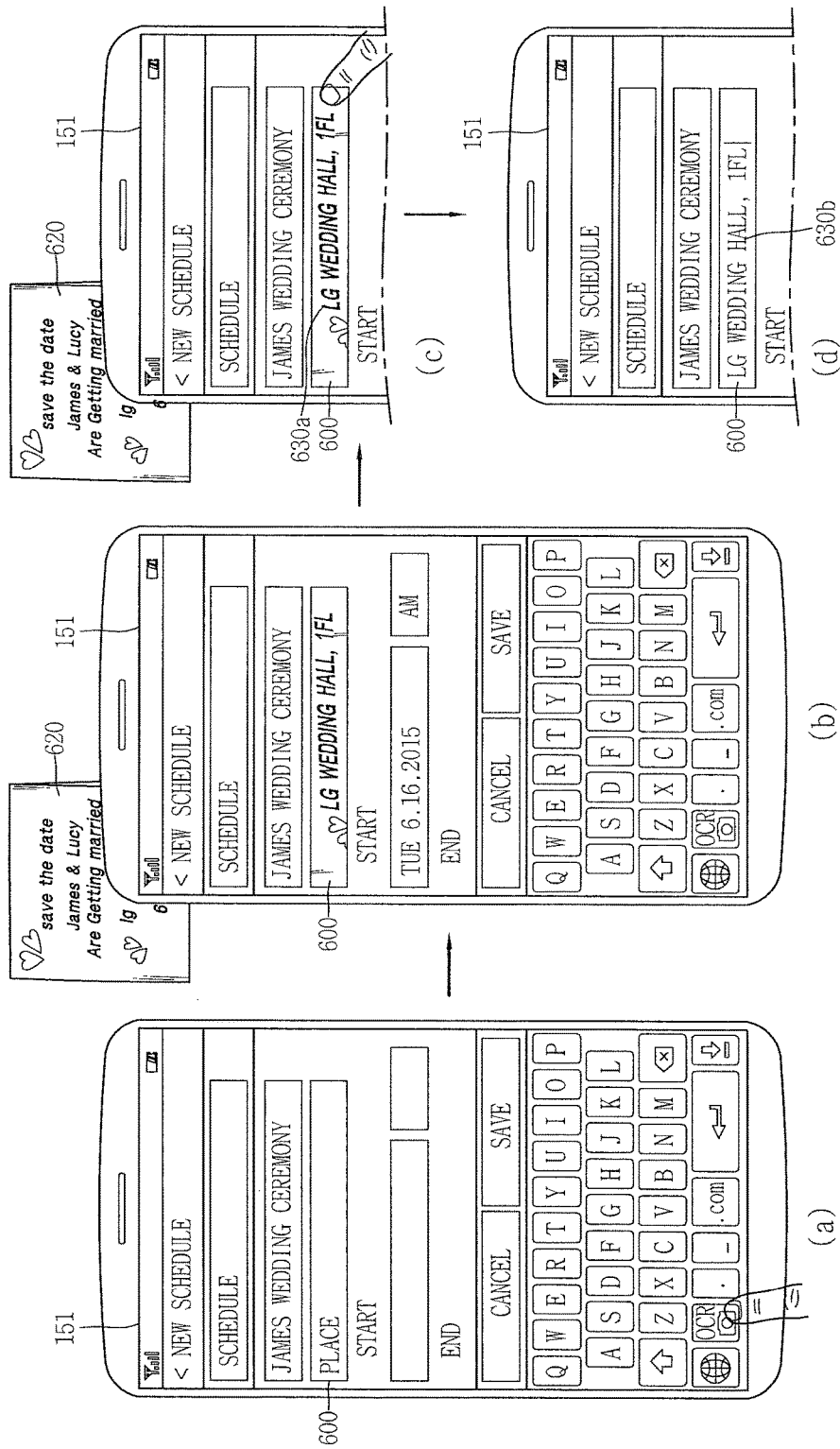

The contents that are described referring to FIG. 7 can be understood more apparently from FIGS. 8A and 8B.

As illustrated in part (a) of FIG. 8A, based on selection of an input field 600, the keypad 200 that includes the first graphic object 300a in conjunction with the OCR function is displayed on the touch screen 151. When the first type touch (for example, the short touch) is applied to the first graphic object 300a, the controller 180, as illustrated in part (b) of FIG. 8A, outputs an image (a preview image) that is received through the camera 121, to the already-selected input field 600.

Screen information 630a that corresponds to text that is printed on a photographic subject 620 is display on the image.

As illustrated in part (c) of FIG. 8A, in a state where screen information (the image) 630a that correspond to the text is included in an image that is displayed on the input field 600, based on the application of the image, the controller 180 selects the screen information 630a.

Subsequently, the controller 180 converts the selected screen information 630a into text, and inputs text 630a that results from the conversion, into the already-selected input field 600.

On the other hand, when the second type touch (for example, the long touch) that is different from the first type touch, as illustrated in part (a) of FIG. 8B, is applied to the first graphic object 300a that is included in the keypad 200, the controller 180, as illustrated in part (b) of FIG. 8B, outputs an image 610 that is received through the camera 121, to at least one portion of an region to which the keypad 200 is output.

At this time, the controller 180, as illustrated in part (b) of FIG. 8B, may display the image (the preview image) 610 that is received through the camera 121, on all regions (a keypad region) to which the keypad 200 is output, and, as illustrated in FIG. 4A may display the image 320 on one portion of the region to which the keypad 200 is output.

Likewise, the screen information 630a that corresponds to the text that is printed on the photographic subject 620 is included in the image 610.

At this time, as illustrated in part (c) of FIG. 8A, when the drag touch is applied to at least one portion of the screen information 630a that corresponds to the text which is included in the image 610, the controller 180 selects screen information 640 to which the drag touch is applied.

In this case, a graphic effect is changed or an indicator is displayed on the selected screen information 640 (or the path that is traced by the drag touch) in order to alert the user that the screen information 640 is selected.

Subsequently, based on the user request (for example, the selection of the button in conjunction with the function of performing the conversion into text, or a completion button), the controller 180 converts the selected screen information 640 into text. Subsequently, as illustrated in part (d) of FIG.

8B, the controller 180 inputs text 640*b* that results from the conversion, into the already-selected input field 600.

With this configuration, according to the present invention, a user interface is provided through which, when performing the OCR function, an image that is received through the camera 121 is displayed on the touch screen in various ways, and at least one portion of the screen information that corresponds to the text which is included in the image is converted into text.

On the other hand, according to the present invention, an interface is provided through which, based on the drag touch, only a portion that the user wants, of the screen information that is included in the image is selected and is converted into text.

Figure 9:
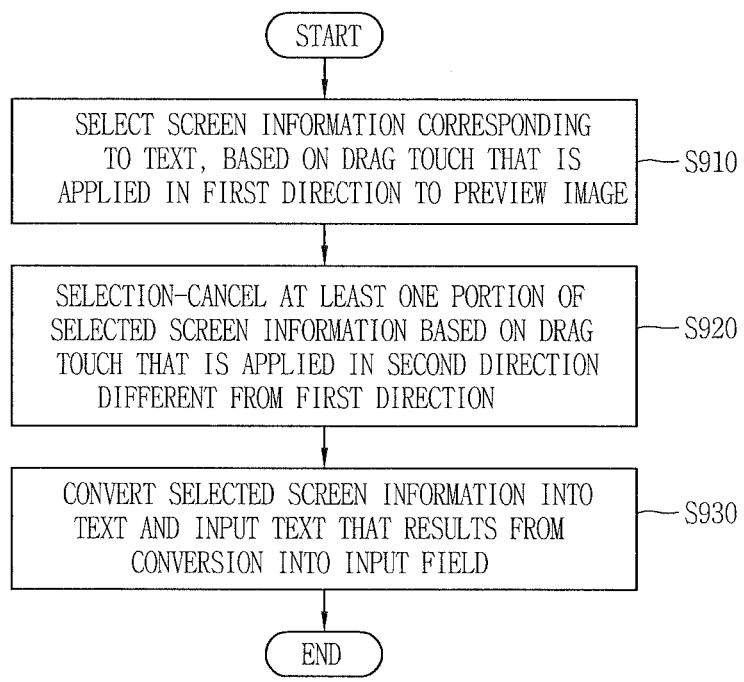
FIG. 9 is a flowchart for describing a method of converting screen information corresponding to text that is included in the image which is received through the camera, according to one embodiment of the present invention.

FIG. 9 is a flowchart for describing a method of converting the screen information corresponding to the text that is included in the image which is received through the camera 121, according to one embodiment of the present invention. FIGS. 10A, 10B, 11A, and 11B are conceptual diagrams for describing the method that is described referring to FIG. 9.

Based on the selection of the first graphic object 300*a* in conjunction with the OCR function, the controller 180 outputs an image that is received through the camera 121, to the touch screen 151.

At this time, in a state where the image is output to the touch screen 151, when the drag touch is applied to screen information that corresponds to text which is included in the image, the controller 180 selects the screen information to which the drag touch is applied.

At this time, based on the drag touch that is applied in a first direction, the screen information is selected.

Specifically, based on the drag touch that is applied in the first direction to an image (a preview image) that is received through the camera 121, the controller 180 selects at least one portion of the screen information that corresponds to the text which is include in the image (S910).

On the other hand, in a state where at least the one portion of the screen information is selected, when the drag touch is applied, in a second direction different from (perpendicular to) the first direction, to the selected screen information, the controller 180 selection-cancels at least one portion of the selected screen information (S920).

Specifically, in a state where at least one portion of the screen information that is included in the image is selected based on the drag touch that is applied in the first direction, when the drag touch is applied in the second direction different from the first direction, the controller 180 selection-cancels a portion of the selected screen information, which overlaps a path that is traced by the drag touch which is applied in the second direction.

Subsequently, based on the user request (for example, the selection of the button in conjunction with the function of performing the conversion into text, or the completion button), the controller 180 converts the selected screen information into text, and inputs the text that results from the conversion into the input field (for example, an already-selected input field) (S930).

Figure 10A:
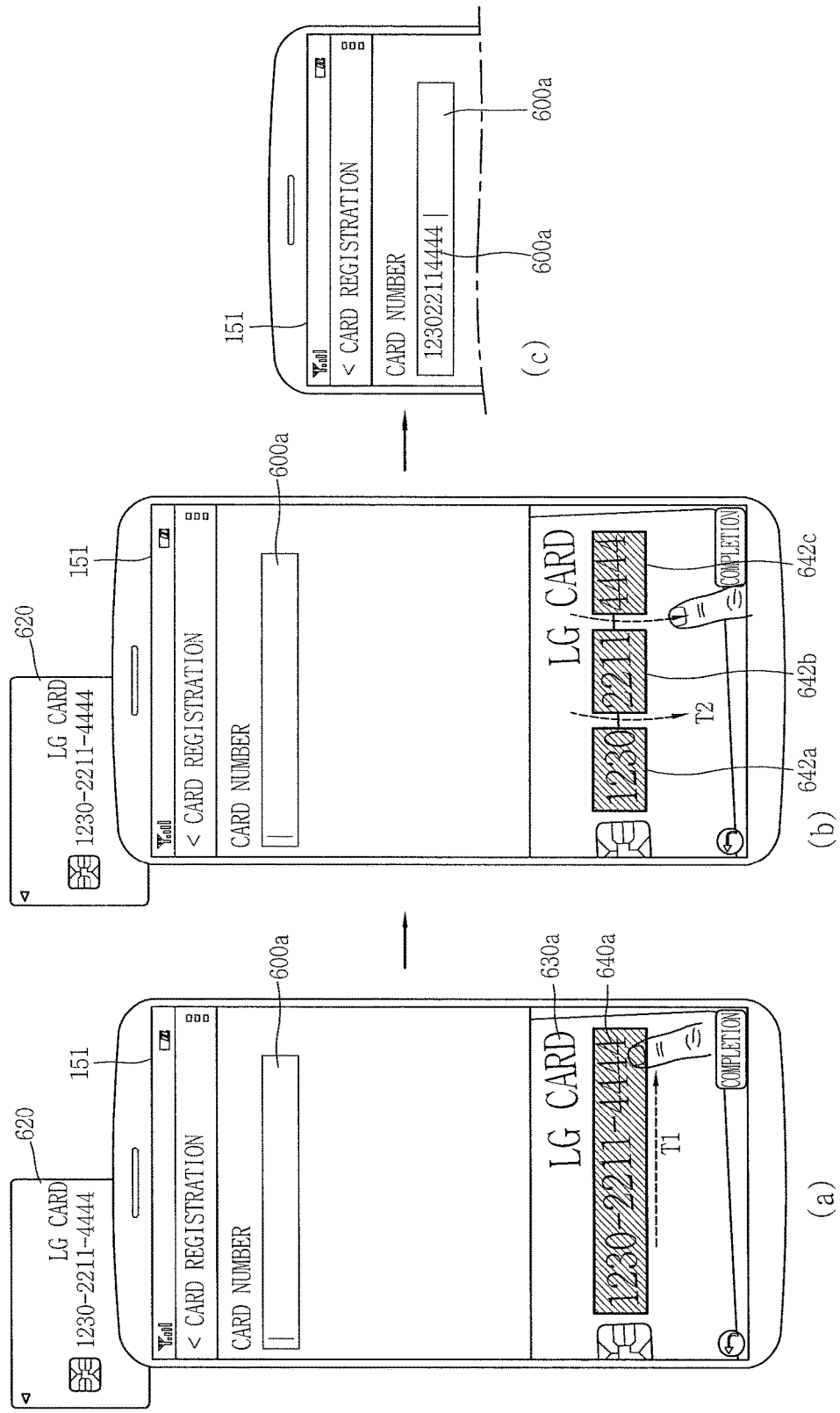
FIGS. 10A, 10B, 11A, and 11B are conceptual diagrams for describing the method that is described referring to FIG. 9.

Referring to FIG. 10A, based on the selection of the graphic object in conjunction with the OCR function, an image that is received through the camera 121 is displayed on the touch screen 151. In this state, when a drag touch T1 (for example, a drag touch that is applied to the right), as illustrated in part (a) of FIG. 10A, is applied in the first direction to the screen information 630*a* that corresponds to the text which is included in the image (the preview image), the controller 180 selects screen information 640*a* to which the drag touch T1 is applied.

At this time, the controller 180 changes a graphic effect of the selected screen information in the mage or displays the selected screen information in such a manner that the selected screen information is visually distinguishable from the other screen information (image), in order to alert the user that the screen information 640*a* is selected.

In a state where the screen information is selected, when a drag touch T2, as illustrated in part (b) of FIG. 10A, is applied in the second direction (for example, in the downward direction) perpendicular to the first direction, the controller 180 selection-cancels at least one portion of the selected screen information.

As illustrated in part (b) of FIG. 10A, at least the one portion that is selection-canceled is a portion in which the selected screen information 640*a* and the drag touch T2 that is applied in the second direction overlaps each other.

Accordingly, the drag touch T2 is applied in the second direction, the selected second direction 640*a* is divided into at least two or more pieces of screen information 642*a*, 642*b*, and 643*c*.

Subsequently, based on the user request (the selection of the button in conjunction with the function of performing the conversion into text or the completion button), the controller 180, as illustrated in part (c) of FIG. 10A, converts the selected pieces of screen information 642*a*, 642*b*, and 642*c* into text and inputs a result of the conversion into an input field 600*a*.

On the other hand, in a state where screen information that corresponds to text is included in an image that is received through the camera 121, when the button (or the completion button) in conjunction with the function of performing the conversion into text is selected without a separate operation of selecting at least one portion of the screen information, the controller 180 converts all pieces of screen information that are included in the image, into text.

That is, based on the user request, the controller 180 converts all pieces of screen information that correspond to the text which is included in the image, into text.

On the other hand, when the drag touch is applied in the first direction to the image, based on the drag touch, the controller 180 selects at least one portion of the screen information.

After the drag touch is applied, in a third direction (in the leftward direction) that is opposite to the first direction (for example, in the rightward direction), to the screen information that is included in the image, when the user request (the selection of the button in conjunction with the function of performing the conversion into text, or the completion button) is made, the controller 180 converts screen information other than the screen information to which the drag touch is applied in the third direction, of the screen information that corresponds to the text which is included in the image.

Figure 10B:
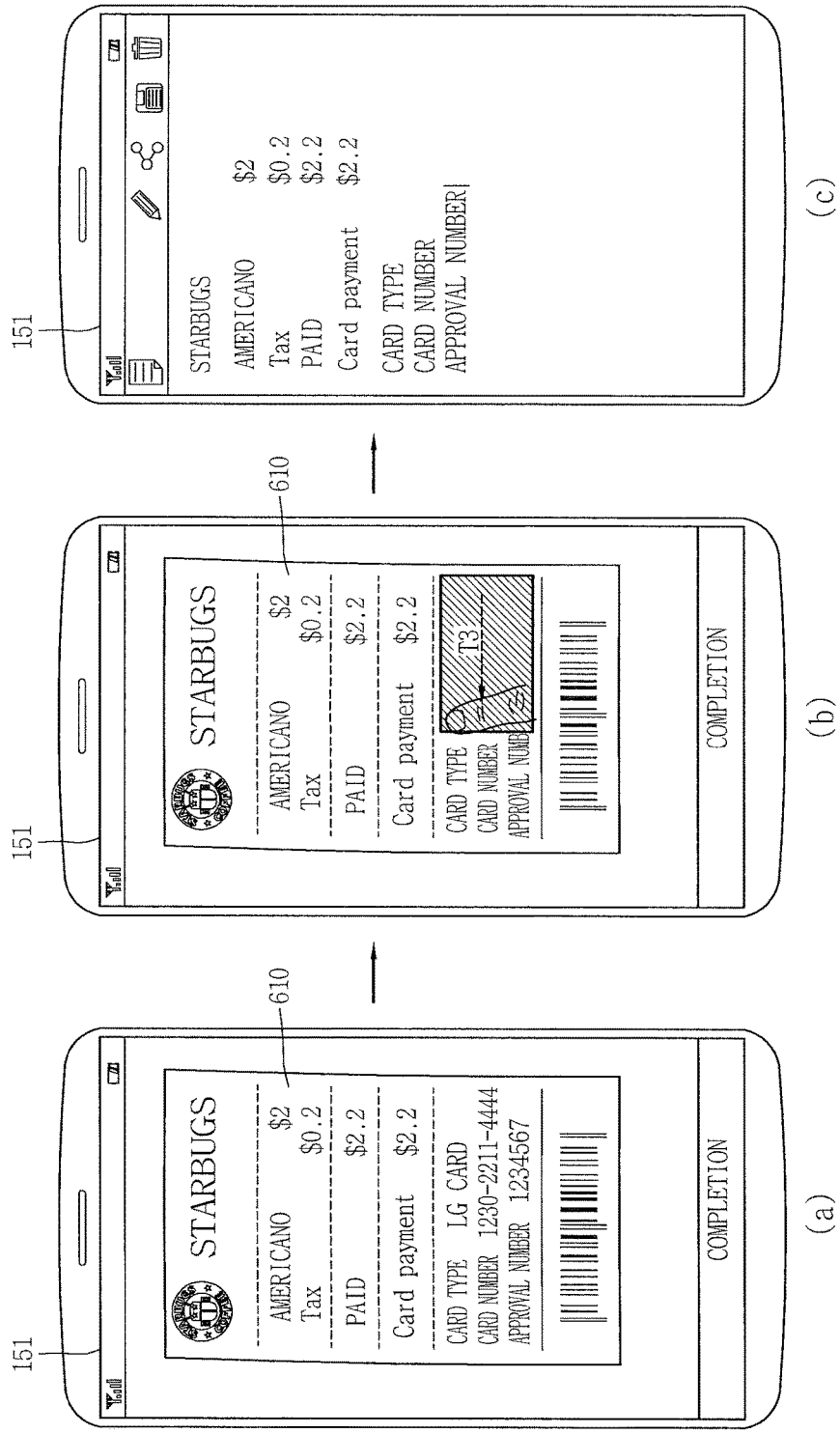

For example, in a state where the preview image is output to the touch screen 151 according to the selection of the first graphic object 300*a*, when the completion button, as illustrated in part (a) of FIG. 10B, is selected without applying a separate touch, the controller 180 converts all pieces of screen information that correspond to the text which is in the preview image, into text.

On the other hand, when a drag touch T3 is applied, in the third direction that is opposite to the first direction, to the image 610, the controller 180, as illustrated in part (b) of FIG. 10B, performs blinding processing on the screen information to which the drag touch T3 is applied, of the screen information that corresponds to the text which is include in the preview image.

In this state, when the user request is received (the button (the completion button) in conjunction with the function of performing the conversion into text is selected), the controller 180, as illustrated in part (c) of FIG. 10B, converts only screen information other than the screen information to which the drag touch T3 is applied, into text. The text that results from the conversion is input into the input field.

With this configuration, according to the present invention, an optimized UI/UX is provided through which only one portion that is included in the image that is received through the camera 121 can be converted into text or portions other than the one portion can be all converted into text.

An additional embodiment of the OCR function (a method of performing the conversion into text) according to the present invention will be described in more detail below referring to the accompanying drawings.

Figure 11A:
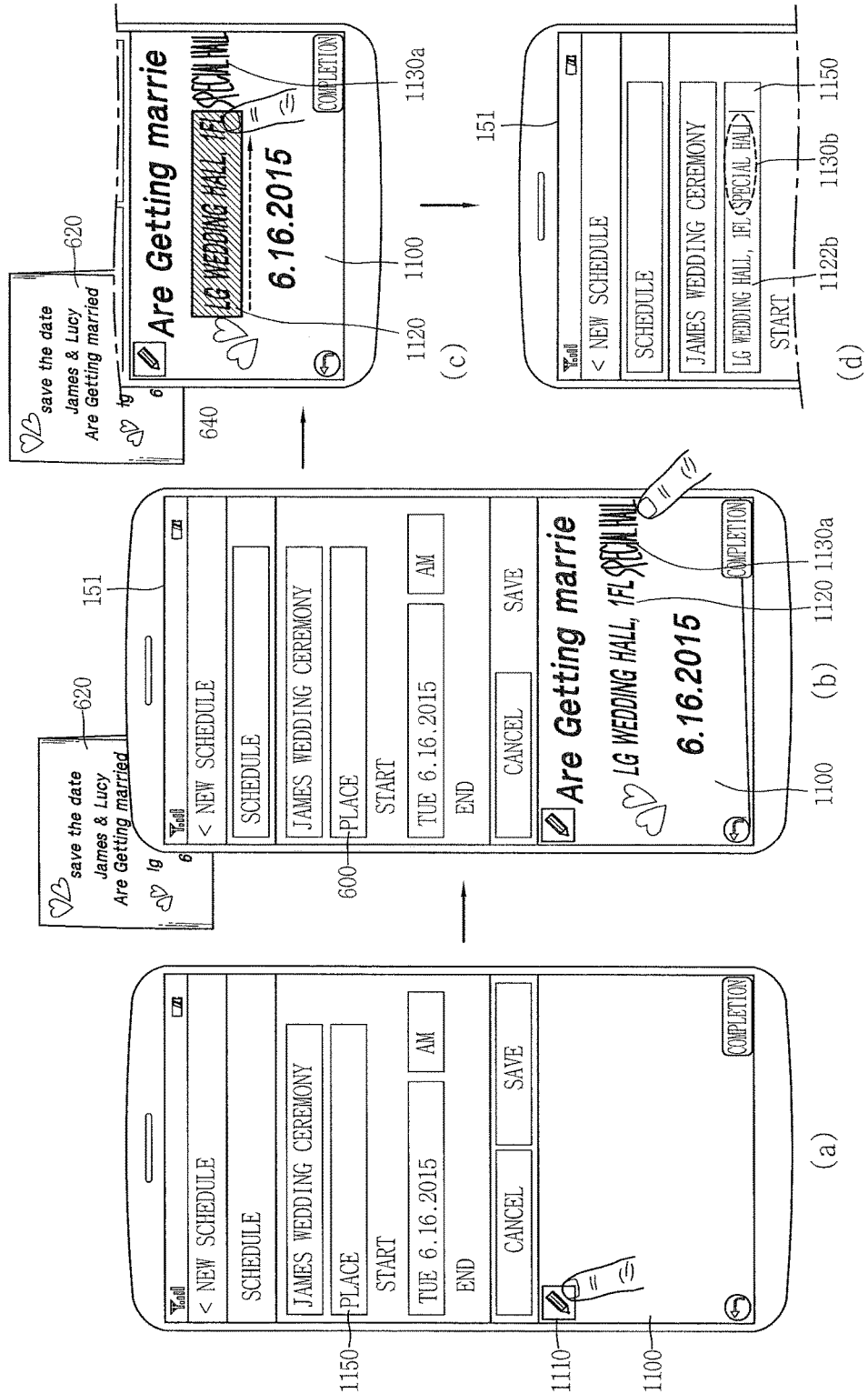

As illustrated in part (a) of FIG. 11A, a button 1110 in conjunction with a function of inputting the screen information into the preview image is displayed on the touch screen 151. The button 1110 is displayed on a preview image 1100.

After the button 1110, as illustrated in part (a) of FIG. 11A, is selected, when the drag touch, as illustrated in part (b) of FIG. 11A, is applied to the preview image 1100, the controller 180 displays screen information 1130a that correspond to a path that is traced by the drag touch, on the preview image 1110.

In addition, when the drag touch is applied in the first direction to the screen information that corresponds to the text which is included in the preview image 1110, the controller 180 selects screen information 1120 to which the drag touch is applied.

In a state where the screen information 1120 is selected or the screen information 1130a that corresponds to the path which is traced by the drag touch is displayed on the preview image 1100, when the button (or the completion button) in conjunction with the function of performing the conversion into text is selected, the controller 180 converts the selected screen information 1120 into text 1122b or converts the screen information 1130a that corresponds to the path which is traced by the drag touch, into text 1130b.

Subsequently, the items of text 1122b and 1130b that result from the conversion are displayed on an input field 1150 that is already selected. At this point, based on positions of the selected screen information 1120 and the screen information 1130a that corresponds to the path which is traced by the drag touch, the controller 180 inputs the items of text that result from the conversion, into the already-selected input field 1150.

With this configuration, according to the present invention, a user interface is provided through which not only the screen information that corresponds to the text which is included in the image that is received through the camera 121, but also the screen information that is input additionally by the user is converted into text at a time.

Figure 11B:
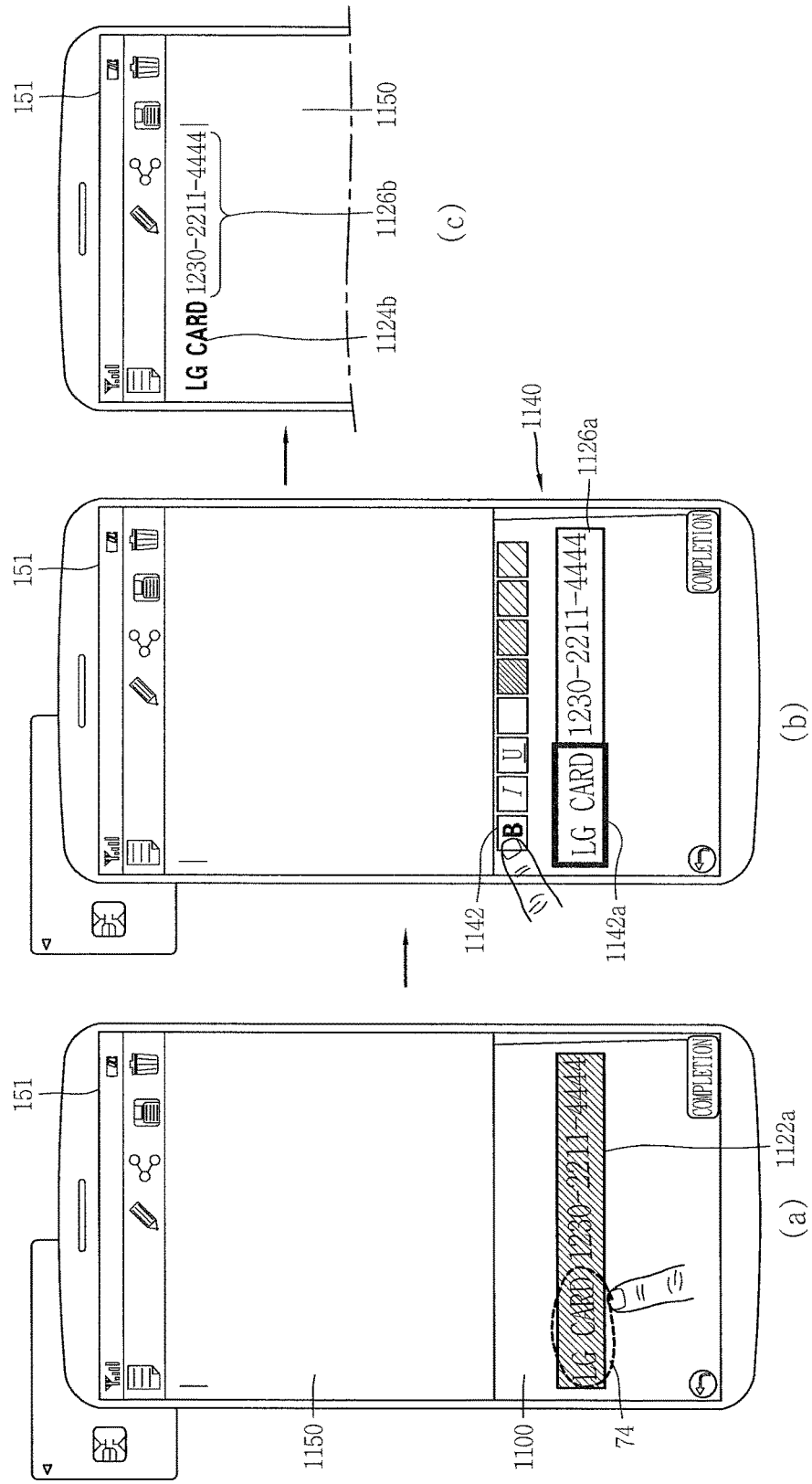

On the other hand, in a state where, screen information 1122a that corresponds to the text, of the information that is included in the preview image 1100, as illustrated in part (a) of FIG. 11B, is screen information, based on application of a predetermined-type touch 74, the controller 180 selects at least one portion of the screen information 1122a.

The predetermined-type touch 74 is a touch that is applied to the selected screen information 1122a. The predetermined-type touches 74 include the drag touch, the long touch, the double touch, the drag touch, and the like that are applied in such a manner as to form a looped curve.

A visual effect is applied to, or an indicator indicates at least one portion 1142a of the screen information to which the predetermined-type touch 74 is applied, of the selected screen information 1122a in such a manner that at least the one portion 1142a is distinguishable from the other portions of the screen information.

On the other hand, when at least one portion 1142a of the screen information is selected, the controller 180 displays buttons 1140 in conjunction with a graphic effect that is to be applied to the text that results from the conversion, on the touch screen 151. As one example, the buttons 1140 are displayed on the preview image 1100.

In a state where at least one portion 1142a f the screen information is selected, after at least one button 1142 (for example, a button in conjunction with a boldface function of making characters thicker) is selected, when the button (or the completion button) in conjunction with the function of performing the conversion into text is selected, the controller 180, as illustrated in part (c) of FIG. 11B, converts the selected screen information 1122a into text, and inputs (displays) text that results from the conversion, into (on) the input field 1150.

At this time, text 1124b that corresponds to at least one portion 1142a of the screen information is displayed on the input field 1150 in a state where a graphic effect in conjunction with at least one button 1142 is applied to the text 1142b.

In a case where at least the selected one button 1142, as illustrated in part (c) of FIG. 11B, is a button in conjunction with the boldface function of making characters thicker, text that corresponds to at least one portion 1142a of the screen information is input into an input field 151 in a state of being boldfaced.

The example is describe above in which the screen information that is included in the preview image is selected and then at least one portion of the screen information is selected, but the present invention is not limited to this. That is, based on the application of the drag touch to the screen information being included in the preview image in the first direction, the controller 180 selects the screen information and outputs the buttons 1140 in conjunction with the graphic effect that is to be applied to the text that results from the conversion, to the touch screen 151. After at least one of the buttons 1140 is selected, when the button (the completion button) in conjunction with the function of performing the conversion into text is selected, the controller 180 converts the selected screen information into text, and inputs the text that results from the conversion, into the input field in a state where the graphic effect in conjunction with the selected button is applied to the text that results from the conversion.

With this configuration, according to the present invention, a user interface is provided through which the graphic effect that is to be applied to the text that results from the conversion is selected in advance in a state where the preview image is output. Thus, a cumbersome procedure for applying the graphic effect to the text that results from the conversion is omitted, thereby remarkably improving user convenience.

A method of inputting an image in the input field using the second graphic object 300b in conjunction with the photographing function will be described in more detail below referring to the accompanying drawings.

Figure 12A:
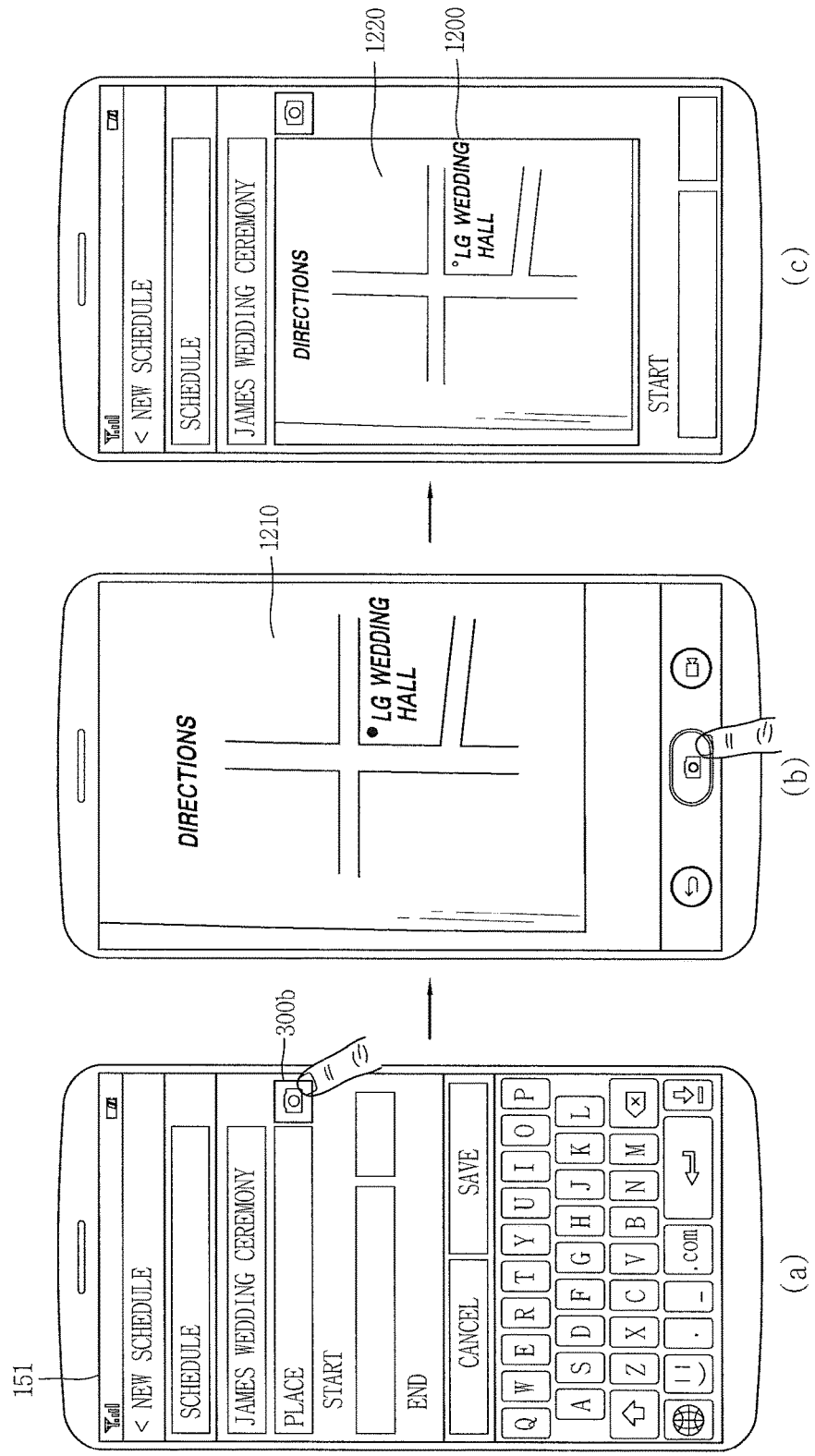
FIGS. 12A and 12B are conceptual diagrams for describing a method of inputting a captured image in an input field in a case where the second graphic object in conjunction with the photographing function is selected.
Figure 12B:
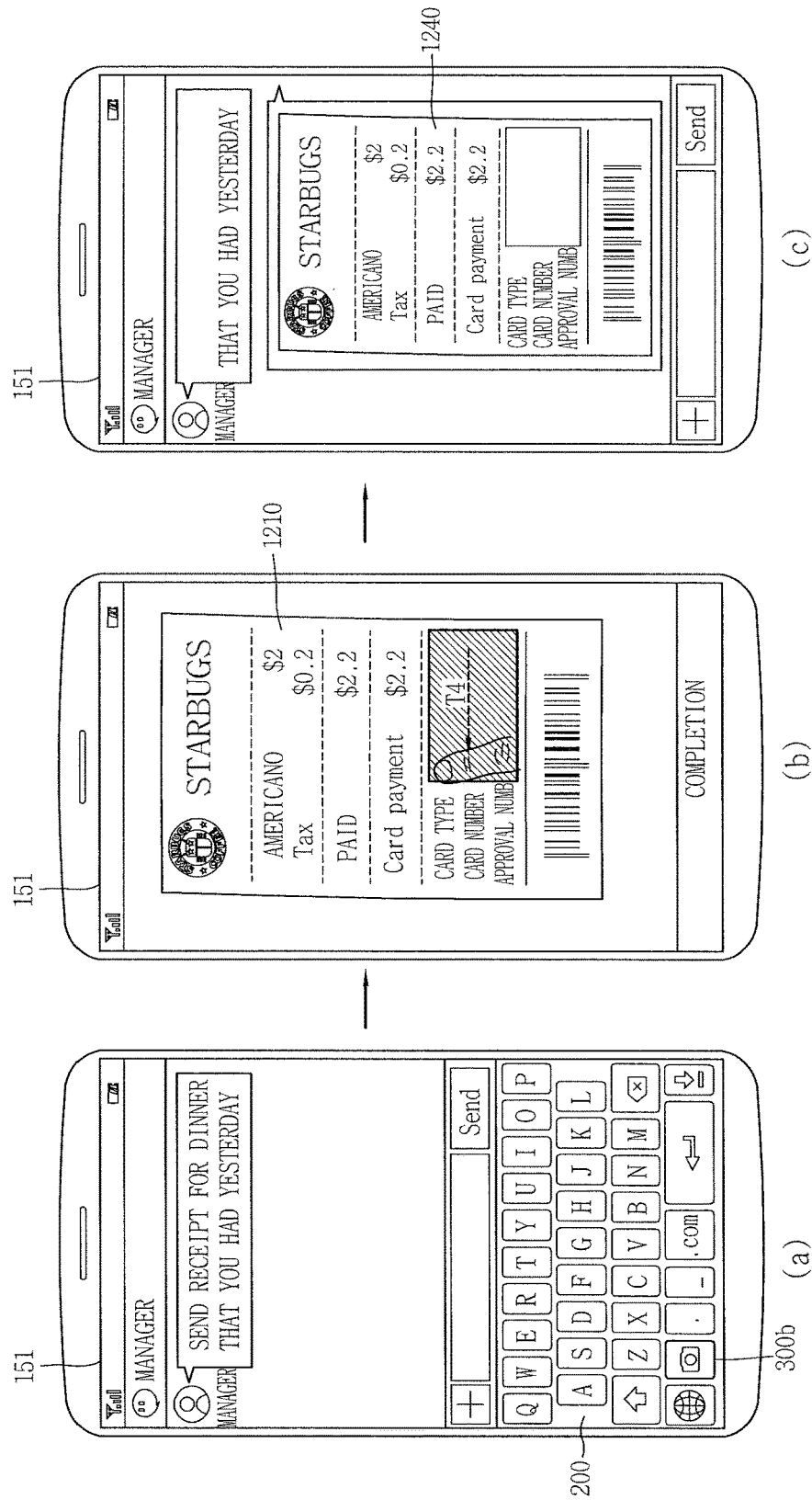

FIGS. 12A and 12B are conceptual diagrams for describing the method of inputting the captures image in the input field in a case where the second graphic object 300b in conjunction with the photographing function is selected.

As illustrated in part (a) of FIG. 12A, the second graphic object 300b in conjunction with the photographing function is displayed on the touch screen 151. The second graphic object 300b is included in the keypad 200 or is displayed on the vicinity (or within) the input field.

In addition, the second graphic object 300b is displayed by default on the vicinity of the input field, or is displayed based on the selection (the touch-on) of the input field.

When the second graphic object 300b is selected, the controller 180, as illustrated in part (b) of FIG. 11A, outputs the image that is received through the camera 121, to the touch screen 151.

In a state where, based on the selection of the second graphic object 300b, an image 1210 is output to the touch screen 151, when a touch is applied to the photographing button 360, the controller 180 captures the image 1210 and displays the captures image 1220 on an input field 1200 that is already selected.

On the other hand, after the drag touch is applied in one direction to the image 1210, when a touch is applied to the photographing button 360, the controller 180 captures the image in such a manner that an image that corresponds to a region to which the drag touch is applied is not output.

For example, in a state where, as illustrated in part (a) of FIG. 12B, based on the application of the touch to the second graphic object 300b in conjunction with the photographing function, the image 1210 that is received through the camera 121 is displayed on the touch screen 151, a drag touch T4 is applied in one direction (for example, to the leftward direction). In this case, the controller 180, as illustrated in part (b) of FIG. 12B, performs the blinding processing in such a manner that the image which corresponds to the region to which the drag touch is applied is not output.

In this state, when a touch is applied to the photographing button 360, the controller 180 captures the image in such a manner that the image that corresponds to the region to which the drag touch is applied is not output, and, as illustrated in part (c) of FIG. 12B, inputs the captured image (the image that is captured in a state where the image that corresponds to the region to which the drag touch is applied is not output) 1240 into the input field. Part (c) of FIG. 12B illustrates one example in which the captured image 1240 is input into the input field and then the captured image 1240 is transmitted on an execution screen of a messenger-related application, through the use of a messenger.

With this configuration, according to the present invention, a user interface is provided through which an image as well as text can be input into the input field in a more convenient manner, and at least one portion of the image is input right into the input field in a state where the one portion of the image is not output.

On the other hand, according to the present invention, the OCR function and the photographing function are performed using user voice.

Figure 13:
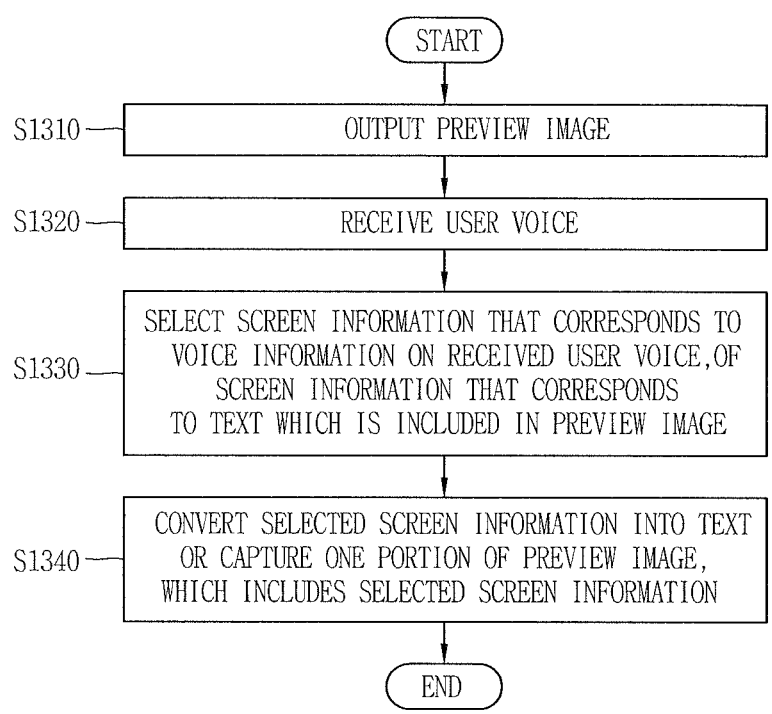
FIG. 13 is a flowchart for describing a method of converting or capturing one portion of screen information that corresponds to text which is included in an image that is received through the camera, according to one embodiment of the present invention.
Figure 14A:
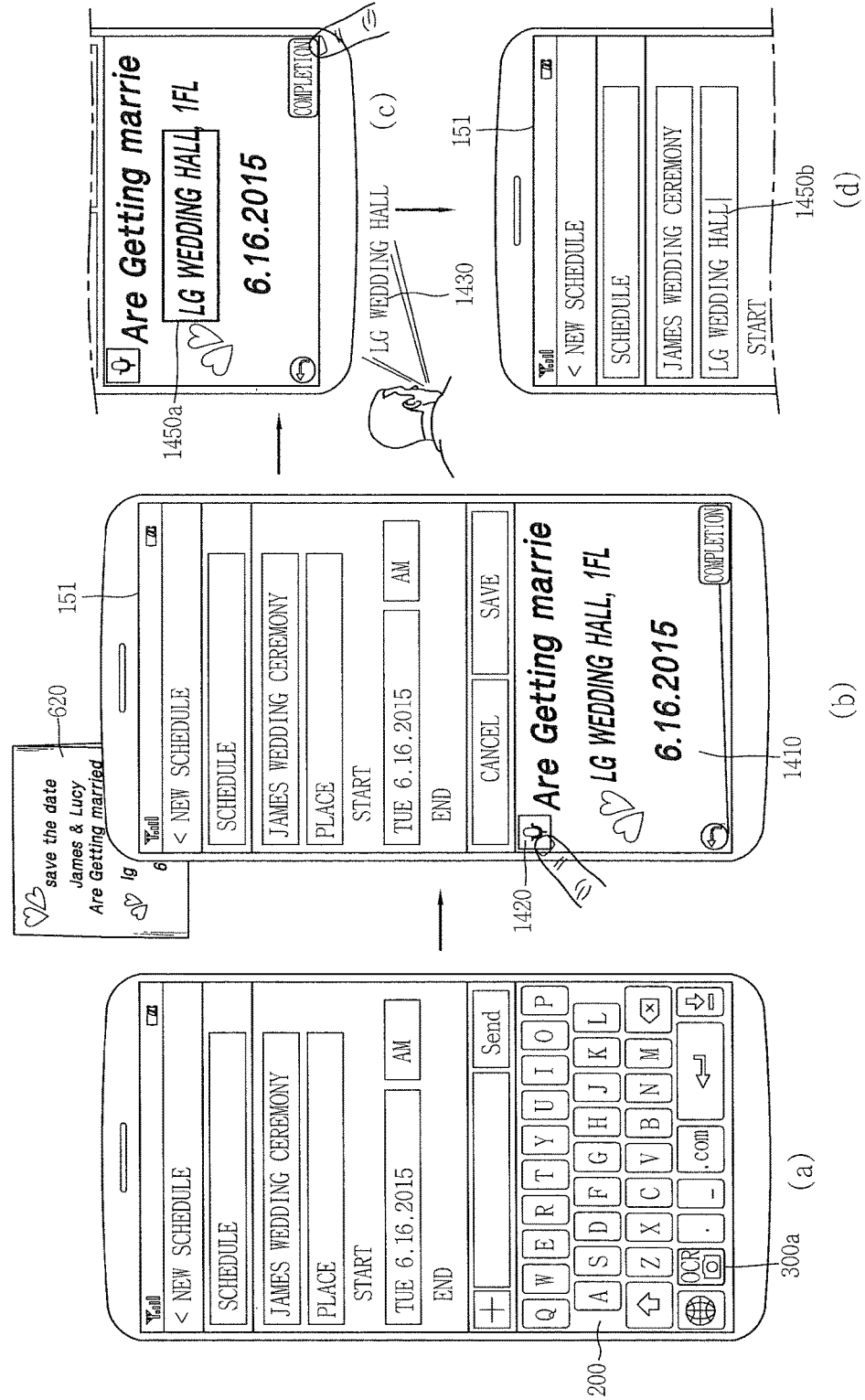

FIG. 13 is a flowchart for describing a method of converting or capturing one portion of screen information that corresponds to text which is included in an image that is received through the camera 121, according to one embodiment of the present invention. FIGS. 14A and 14B are conceptual diagrams for describing the method that is described referring to FIG. 13.

Referring to FIG. 13, based on the selection of one of the first graphic object 300a and the second graphic object 300b, the controller 180 outputs the image that is received through the camera 121, to the touch screen 151 (S1310).

In a state where the image is output, the controller 180 receives the user voice (S1320). Specifically, based on the output of the image, or based on selection of a microphone drive (activation) button that is displayed on the touch screen 151, the controller 180 drives (activates) the microphone 122 and receives the user voice through the microphone 122.

When the user voice is received, the controller 180 selects screen information that corresponds to voice information on the received user voice, of the screen information that corresponds to the text which is included in the preview image (S1330).

Subsequently, the controller 180 converts the selected screen information into text or captures only one portion of the preview image, which includes the selected screen information.

Specifically, in a case where the preview image is output based on the selection of the first graphic object 300a in conjunction with the OCR function, the controller 180 converts the selected screen information into text, and inputs the text that results from the conversion, into the already-selected input field.

In addition, in a case where the preview image is output based on the selection of the second graphic object 300b in conjunction with the photographing function, the controller 180 captures only one portion of the preview image, which includes the selected screen information, and inputs the captured one portion into the already-selected input field.

The contents described above can be understood more apparently from FIGS. 14A and 14B.

When the first graphic object 300a in conjunction with the OCR function, as illustrated in part (a) of FIG. 14A, is selected, the controller 180, as illustrated in part (b) of FIG. 14A, outputs an image 1410 that is received through the camera 121, to the touch screen 151. The image 1410 is displayed on one region of the touch screen 151.

A button 1420 in conjunction with a function of driving the microphone is displayed on the image 1410. When the button 1420 is selected, the controller 180, as illustrated in part (b) of FIG. 0.14A, activates the microphone 122. However, based on the selection of the first graphic object 300a, or based on the displaying of the image 1410 on the touch screen 151, the microphone 122 may be driven (activated).

In a case where the microphone 122 is activated, when user voice 1430, as illustrated in part (c) of FIG. 14A, is received, the controller 180 selects screen information 1450a that corresponds to the user voice, of the screen information that corresponds to the text which is included in the image 1410.

Subsequently, in a state where the screen information 1450a is selected, when the button (or the completion button) in conjunction with the function of performing the conversion into text is selected, the controller 180, as illustrated as in part (d) of FIG. 14A, converts the selected screen information 1450a into text, and input text 1450b that results from the conversion, into the already-selected input field.

At this time, a type of information that is input into the input field is text.

On the other hand, as illustrated in part (a) of FIG. 14B, based on the selection of the second graphic object 300b in conjunction with the photographing function, the image that is received through the camera 121 is displayed on the touch screen 151.

Likewise, the button 1420 in conjunction with the function of driving the microphone is displayed on the image 1410. When the button 1420 is selected, the controller 180, as illustrated in part (b) of FIG. 14B, activates the microphone 122. However, based on the selection of the second graphic object 300b, or based on the displaying of the image 1410 on the touch screen 151, the microphone 122 may be drive (activated).

In a state where the microphone 122 is activated, when user voice 1450, as illustrated in part (c) of FIG. 14B, is received, the controller 180 selects the screen information 1450a that corresponds to the user voice, of the screen information that corresponds to the text which is included in the image 1410.

Subsequently, in a state where the screen information 1450a is selected, when the photographing button 360 is selected (touched on), the controller 180, as illustrated in part (d) of FIG. 14B, captures only one portion of the preview image, which includes the selected screen information.

Subsequently, the controller 180 inputs the captured image (the image that corresponds to one portion that includes the selected screen information) 1450c into the already-selected input field.

At this time, a type of information that is input into the input field is an image.

As described above, according to the present invention, an interface is provided through which information that the user wants can be input in an optimized way.

In addition, according to the present invention, a UI/UX is provided through which only a portion that corresponds to the screen information that the user wants, of the screen information that corresponds to the text which is included in the image that is received through the camera 121 is converted into text.

In addition, according to the present invention, at least one of the graphic object 300a in conjunction with the OCR function and the graphic object 300b in conjunction with the photographing function is output to the keypad 200. Thus, an interface is provided through which information that the user wants to input is selected in a more convenient manner.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a camera;
a touch screen; and
a controller configured to display, on the touch screen, a keypad comprising at least one of a first graphic object or a second graphic object, the controller configured to display the first graphic object in conjunction with an optical character reader (OCR) function relating to the camera and to display the second graphic object in conjunction with a photographing function relating to the camera,
wherein the controller is configured to display both the first graphic object and the second graphic object together on the keypad or to display one graphic object among the first graphic object and the second graphic object on the keypad, and
wherein the controller is configured to:
based on displaying one graphic object among the first graphic object and the second graphic object on the keypad, determine whether a predetermined type of touch input has been applied to the displayed one graphic object; and
based on a determination that the predetermined type of touch input has been applied to the displayed one graphic object, change the displayed one graphic object to the other graphic object among the first graphic object and the second graphic object that is different from the displayed one graphic object.

2. The mobile terminal of claim 1, wherein:
based on the displayed one graphic object being the first graphic object, the other graphic object is the second graphic object, and
based on the displayed one graphic object being the second graphic object, the other graphic object is the first graphic object.

3. The mobile terminal of claim 1, wherein the touch screen comprises one or more input fields, and
wherein the controller is configured to:
determine that a touch input has been applied to one of the one or more input fields;
based on the determination that a touch input has been applied to the one of the one or more input fields, map the one of the one or more input fields to the first graphic object, the second graphic object, or both the first graphic object and the second graphic object; and
based on the mapping, display, on the touch screen, the keypad comprising at least one of the first graphic object or the second graphic object.

4. The mobile terminal of claim 3, wherein the controller is further configured to:
determine information associated with the one of the one or more input fields to which the touch input is applied;
determine an input capability for the one of the one or more input fields; and
map the one of the one or more input fields to the first graphic object, the second graphic object, or both the first graphic object and the second graphic object based on the information associated with the one of the one or more input fields to which the touch input is applied and based on the determined input capability for the one of the one or more input fields to which the touch input is applied.

5. The mobile terminal of claim 4, wherein the controller is further configured to:
determine whether the input capability for the one of the one or more input fields to which the touch input is applied corresponds to a text input or an image input;
based on a determination that the input capability for the one of the one or more input fields to which the touch input is applied corresponds to a text input, display the first graphic object on the keypad; and
based on a determination that the input capability for the one of the one or more input fields to which the touch input is applied corresponds to an image input, display the second graphic object on the keypad.

6. The mobile terminal of claim 1, wherein the controller is further configured to:
determine that one of the first graphic object or the second graphic object has been selected by a user;
receive, through the camera, an image; and
based on the determination that one of the first graphic object or the second graphic object has been selected by the user, display, on the touch screen, the image that was received through the camera.

7. The mobile terminal of claim 6, wherein the controller is further configured to:
based on a determination that the selected one of the first graphic object or the second graphic object is the first graphic object:
determine a partial region of the touch screen in which to output the received image; and
output the received image to the determined partial region of the touch screen; and
based on a determination that the selected one of the first graphic object or the second graphic object is the second graphic object, output the received image to an entire region of the touch screen.

8. The mobile terminal of claim 7, wherein the controller is configured to determine the partial region of the touch screen in which to output the received image by:
determining a type of the touch input that has been applied to the first graphic object by the user; and
determining the partial region of the touch screen based on the determined type of touch input that has been applied to the first graphic object by the user.

9. The mobile terminal of claim 8, wherein the controller is configured to:
determine whether the type of the touch input that has been applied to the first graphic object by the user is a first type of touch input or a second type of touch input;
based on a determination that the type of the touch input that has been applied to the first graphic object by the user is the first type of touch input, display the received image on an already-selected input field displayed on the touch screen; and
based on a determination that the type of the touch input that has been applied to the first graphic object by the user is the second type of touch input, display the received image on at least one portion of the keypad.

10. The mobile terminal of claim 6, wherein the controller is further configured to:
determine that the one of the first graphic object or the second graphic object that has been selected by a user is the first graphic object;
based on the determination that the one of the first graphic object or the second graphic object that has been selected by a user is the first graphic object and that the received image is displayed on the touch screen, determine that a drag type of touch input has been applied to a region of the touch screen on which the image is displayed;
determine that the region of the touch screen on which the drag type of touch has been applied displays image information that corresponds to text included in the image; and
select the image information displayed in the region of the touch screen to which the drag type of touch input has been applied and that corresponds to the text included in the image.

11. The mobile terminal of claim 10, wherein the controller is further configured to:
determine that a user request has been received; and
based on the determination that the user request has been received:
convert, into text, the selected image information displayed in the region of the touch screen to which the drag type of touch input has been applied;
determine an input field that has been selected by the user; and
input the converted text into the selected input field.

12. The mobile terminal of claim 10, wherein the controller is further configured to:
determine that the drag type of touch input has been applied in a first direction;
based on the determination that the drag type of touch input has been applied in the first direction, select the image information displayed in the region of the touch screen to which the drag type of touch input has been applied in the first direction;
determine that a second drag type of touch input, subsequent to the drag type of touch input applied in the first direction, has been applied to the touch screen in a second direction perpendicular to the first direction; and
based on the determination that the second drag type of touch input has been applied in the second direction, cancel the selection of at least a portion of the selected image information.

13. The mobile terminal of claim 10, wherein the controller is further configured to:
determine that a user request has been received;
based on the determination that the user request has been received, convert, into text, the image information displayed on the touch screen that corresponds to text included in the image;
determine whether the drag type of touch input has been applied in a first direction or in a third direction opposite to the first direction;
based on a determination that the drag type of touch input has been applied in the first direction, select, for conversion into text, a portion of the image information displayed in the region of the touch screen to which the drag type of touch input has been applied in the first direction; and
based on a determination that the drag type of touch input has been applied in the third direction that is opposite to the first direction, select, for conversion into text, portions of the image information other than a portion to which the drag type of touch input has been applied in the third direction.

14. The mobile terminal of claim 6, wherein the controller is further configured to:

determine that the one of the first graphic object or the second graphic object that has been selected by a user is the second graphic object;

determine that a touch input has been applied to a photographing button of the mobile terminal; and based on the determination that the one of the first graphic object or the second graphic object that has been selected by a user is the second graphic object and that a touch input has been applied to the photographing button of the mobile terminal:

determine an input field that has been selected by the user;

capture the received image; and display the captured image in the selected input field.

15. The mobile terminal of claim 14, wherein the controller is further configured to:

determine that a drag type of touch input has been applied to a region of the touch screen displaying the received image; and capture the image such that a portion of the image that corresponds to the region of the touch screen to which the drag type of touch input has been applied is not output.

* * * * *